US012574122B2

(12) United States Patent
Bernardi

(10) Patent No.: US 12,574,122 B2
(45) Date of Patent: Mar. 10, 2026

(54) QUANTUM ENTANGLEMENT DISTRIBUTION USING MULTIPLE OPTICAL PATHS AND AUTOMATED SWITCHOVER

(71) Applicant: Amazon Technologies, Inc., Seattle, WA (US)

(72) Inventor: Giacomo Bernardi, Bologna (IT)

(73) Assignee: Amazon Technologies, Inc., Seattle, WA (US)

( * ) Notice: Subject to any disclaimer, the term of this patent is extended or adjusted under 35 U.S.C. 154(b) by 430 days.

(21) Appl. No.: 18/345,984

(22) Filed: Jun. 30, 2023

(65) Prior Publication Data

US 2025/0007621 A1 Jan. 2, 2025

(51) Int. Cl.
*H04B 10/70* (2013.01)
*H04B 10/079* (2013.01)
*H04B 10/25* (2013.01)

(52) U.S. Cl.
CPC ....... *H04B 10/70* (2013.01); *H04B 10/07955* (2013.01); *H04B 10/25* (2013.01)

(58) Field of Classification Search
CPC .. H04B 10/70; H04B 10/25; H04B 10/07955; H04B 10/0791; H04L 43/0823
See application file for complete search history.

(56) References Cited

U.S. PATENT DOCUMENTS

| 8,358,929 B2 | 1/2013 | Lewis et al. |
| 11,641,242 B1 | 5/2023 | Bhaskar et al. |

| 2001/0038473 A1 | 11/2001 | Li et al. |
| 2008/0175385 A1 | 7/2008 | Lee et al. |
| 2010/0027989 A1 | 2/2010 | Lewis et al. |
| 2020/0396067 A1 | 12/2020 | Barker |
| 2021/0105135 A1 | 4/2021 | Figueroa |
| 2021/0176055 A1* | 6/2021 | Rahman ................ H04L 9/0855 |
| 2022/0026195 A1 | 1/2022 | Fertig |

(Continued)

FOREIGN PATENT DOCUMENTS

KR 20210028937 A * 3/2021 ........... H04B 10/506

OTHER PUBLICATIONS

K. Boone, et al., "Entanglement over global distances via quantum repeaters with satellite links," arXiv preprint: arXiv:1410.5384v1 [quant-ph] 2014, pp. 1-8.

(Continued)

*Primary Examiner* — Hibret A Woldekidan
(74) *Attorney, Agent, or Firm* — Alexander A. Knapp; Kowert, Hood, Munyon, Rankin & Goetzel, P.C.

(57) ABSTRACT

A system and method for distributing quantum entanglement using optically protected fiber optical paths is described. In some embodiments, multiple optical paths are used to connect a source site to a receiver site. Quantum entangled particles are transmitted from the source site to the receiver site using a first one of the multiple optical paths and related service channel information is transmitted from the source site to the receiver site using a second one of the multiple optical paths. In response to a failure of either the first or second optical path, an entanglement distribution controller automatically updates the routing such that the service channel information and the quantum entangled particles are routed concurrently on a remaining one of the first or second optical path.

20 Claims, 15 Drawing Sheets

(56)                References Cited

U.S. PATENT DOCUMENTS

| | | |
|---|---|---|
| 2023/0188335 A1 | 6/2023 | Linares et al. |
| 2023/0188548 A1 | 6/2023 | Bhaskar et al. |
| 2024/0085240 A1* | 3/2024 | Sanzaro .................... G01J 1/44 |

OTHER PUBLICATIONS

Jasminder S. Sidhu, et al., "Advances in Space Quantum Communications," IET Research Journals, © The Institution of Engineering and Technology 2015, pp. 1-26.

Sheng-Kai Liao, et al. "Satellite-relayed intercontinental quantum network," Physical Review Letters 120, 030501 (2018), pp. 1-4.

Mustafa Gündoğan, et al., "Proposal for space-borne quantum memories for global quantum networking," www.nature.com/npjqi, npj Quantum Information vol. 7, Article No. 128 (2021), pp. 1-10.

M. K. Bhaskar, et al., "Experimental demonstration of memory-enhanced quantum communication," Nature | vol. 580 | 2020, pp. 60-76.

Boone et al, "Entanglement over global distances via quantum repeaters with satellite links", Physical Review A 91 (2015), arXiv:1410. 5384 [quant-ph], pp. 1-8.

Sidhu et al, "Advances in Space Quantum Communications", IET Research Journals, arXiv:2103.12749 (2021), pp. 1-26.

Gundogan et al, "Proposal for space-borne quantum memories for global quantum networking," NPJ Quantum Information 7:128 (2021), pp. 1-10.

Pirandola, "Satellite quantum communications: Fundamental bounds and practical security", Physical Review Research 3, 023130 (2021), Published by the American Physical Society, pp. 1-29.

Harney and Pirandola, "Optimal Performance of Global Quantum Networks", arXiv:2104.10701 (2021), pp. 1-14.

Liao et al, "Satellite-Relayed Intercontinental Quantum Network," Physical Review Letters 120, 030501 (2018), arXiv:1801.04418 [quant-ph], pp. 1-10.

Li Zhonghui et al: "Building a large-scale and wide-area quantum Internet based on an OSI-alike model", China Communications, China Institute of Communications, Nov. 2, 2021, pp. 1-14, vol. 18, No. 10, Piscataway, NJ, USA.

U.S. Appl. No. 18/194,278, filed Mar. 31, 2023, Linares, et al.

International Search Report and Written Opinion mailed Nov. 25, 2025 in PCT/US2024/034476, Amazon Technologies, Inc., 16 pages.

Jürgen Rahn ed., "Transmission and Multiplexing; Physical aspects of "OTN"", ETSI Draft; TD083, European Telecommunications Standards Institute (ETSI), 650, Route Des Lucioles; F-06921 Sophia-Antipolis ; FRANCE, No. Version: 0.2, Apr. 2, 1999, pp. 1-56, [retrieved on Apr. 2, 1999].

"Passive optical network protection considerations", ITU-T Standard G.SUP51, International Telecommunication Union, Geneva, CH, Jun. 30, 2017, pp. 1-46, Retrieved from the Internet: URL:http://mirror2.itu.int/dms/pay/itu-t/rec/g/T-REC-G.Sup51-201706-I !! PDF-E.pdf [retrieved on Aug. 25, 2017].

Dezhi Zhang ed., "Draft Recommendation Itu-T G.9804.1 Amd. 1"; International Telecommunication Union; Study Period 2021-2024; Study Group 15; Series TD702/PLEN, Geneva ; CH vol. 2/15 Mar. 26, 2021, pp. 1-69, Retrieved from the Internet: URL:https://www.itu.int/ifa/t/2017/sg15/docs/210412/td/ties/plen/T17-SG15-210412-TDPLEN-0702 !! MSW-E.docx, [retrieved on Mar. 26, 2021].

* cited by examiner

⋮                                  ⋮

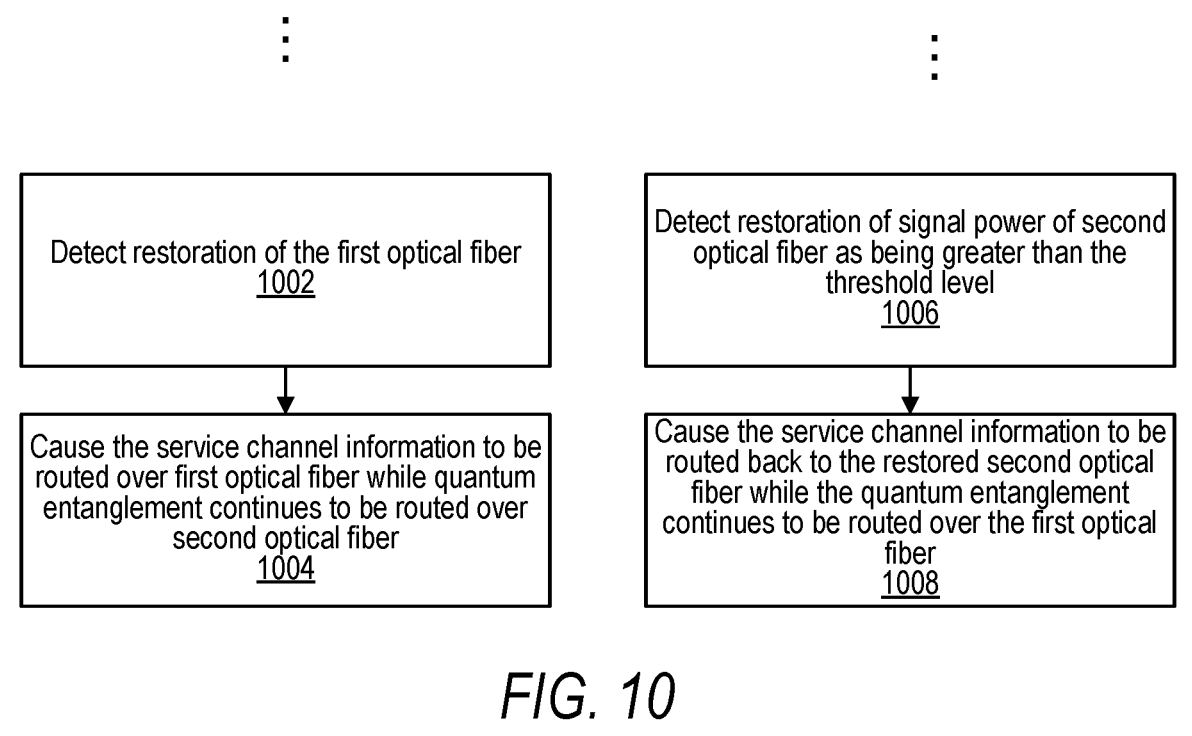

Detect restoration of the first optical fiber
1002

Detect restoration of signal power of second optical fiber as being greater than the threshold level
1006

Cause the service channel information to be routed over first optical fiber while quantum entanglement continues to be routed over second optical fiber
1004

Cause the service channel information to be routed back to the restored second optical fiber while the quantum entanglement continues to be routed over the first optical fiber
1008

FIG. 10

QUANTUM ENTANGLEMENT DISTRIBUTION USING MULTIPLE OPTICAL PATHS AND AUTOMATED SWITCHOVER

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the absolute sum of the complex numbers must sum to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

Public networks often rely on public key distribution mechanisms that have a security foundation based on the assumption that certain mathematical problems, e.g., integer factoring, cannot be solved efficiently. If these assumptions do not hold, such security is critically weakened. The advancement of quantum computers that can efficiently solve the factoring problem is an example of a cryptographic threat to such communications.

BRIEF DESCRIPTION OF THE DRAWINGS

FIG. 10 is a flowchart illustrating restoration of a reserve optical path and re-configuration of a quantum entanglement distribution system using optical line protection in response to the restoration of the reserve optical path, according to some embodiments.

Figure 1:
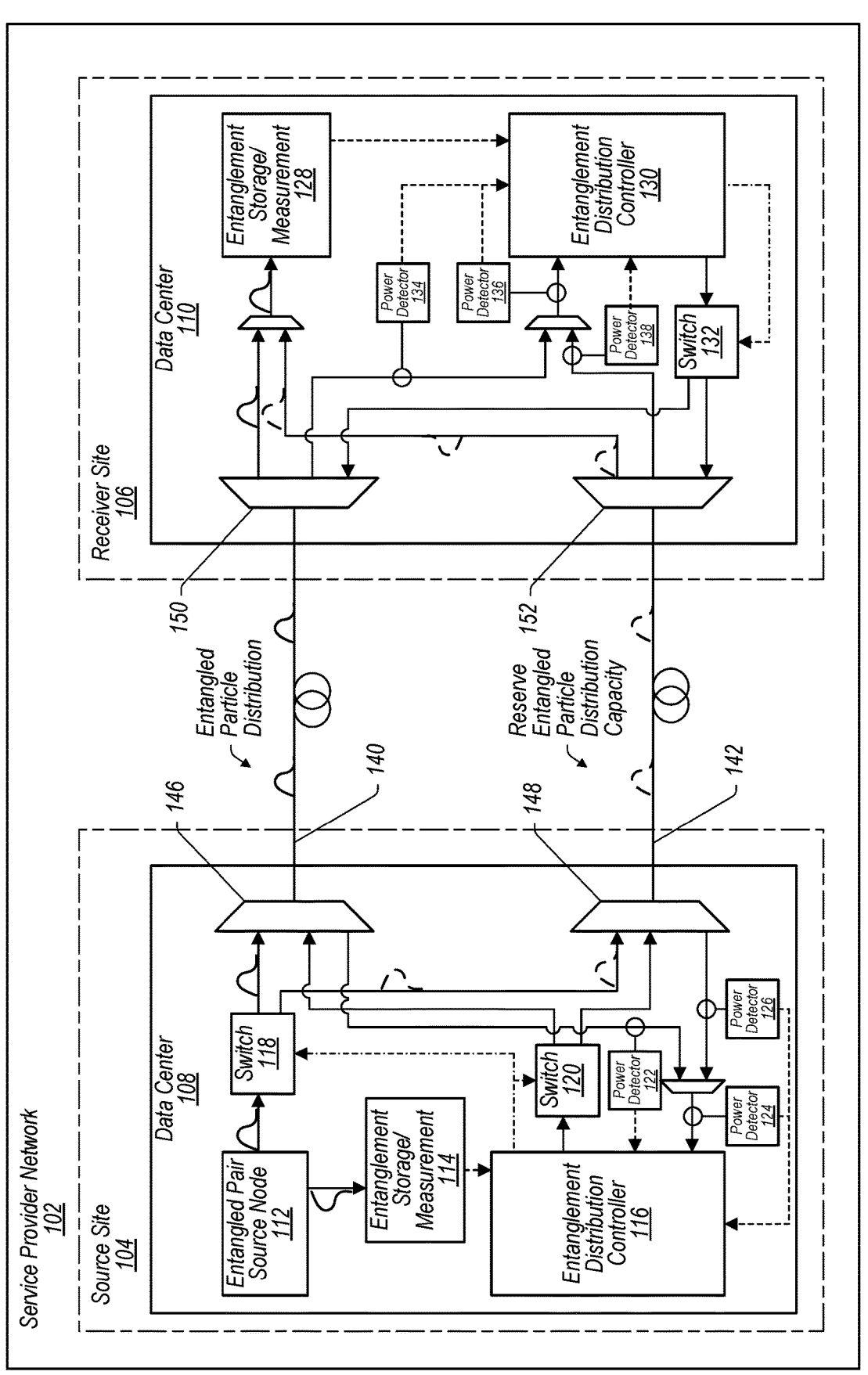
FIG. 1 illustrates a service provider network comprising data centers located at a source site and a receiver site, wherein dual fiber optic paths with optical line protection are used to distribute quantum entanglement from the data center at the source site to the data center at the receiver site, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including" and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for distributing quantum entanglement using optical line protection. In some embodiments, multiple optical paths may be used to connect a source site and a receiver site of a quantum entanglement distribution system. A quantum entanglement distribution controller may route entangled particles for distribution from the source site to the receiver site using a first one of the multiple optical paths and may concurrently route service channel information associated with the distributed quantum entanglement over a second one of the multiple optical paths. Both the first and second ones of the multiple optical paths are configured to distribute the quantum entangled particles and the service channel information. Thus, if either of the first or second optical paths fail, the routing flow may be re-routed to route both the entangled quantum particles and the service channel information over the remaining one of the first or second optical paths. Also, because both the first and second optical paths are used during normal conditions (e.g., no failure conditions), failures of either of the redundant optical paths are quickly identified and can therefore be scheduled for repair.

Quantum entangled distribution with optical line protection, as discussed herein, can be contrasted with mere redundant quantum entanglement distribution systems. For example, simply adding a second redundant system for quantum entanglement distribution provides a less reliable and/or less efficient distribution network than the disclosed quantum entanglement distribution system with optical line protection. This is because in such configurations, a primary quantum entanglement distribution system is used while a secondary quantum entanglement distribution system sits idle, waiting to be needed in case of a failure of the primary quantum entanglement distribution system. However, quantum entanglement distribution systems, when left idle, may fail and such failures may go undetected. For example, a secondary quantum entanglement distribution system may fail while sitting idle and while a primary quantum entanglement distribution system is used to distribute quantum entangled particles. Also, the failure of the secondary quantum entanglement distribution system may only become known when the primary quantum entanglement distribution system fails and the secondary quantum entanglement distribution system is attempted to be put in service. However, at this point, the concurrent failures of the primary and secondary quantum entanglement distribution systems may lead to an interruption of service. As can be seen, simply adding an additional spare quantum entanglement distribution system may not provide suitable reliability. Additionally, adding more testing of the additional spare quantum entanglement distribution system to periodically check for failure may be costly and provide a less efficient solution than quantum entanglement distribution with optical line protection, as discussed herein.

Additionally, the distributed quantum entangled particles are distributed in a superposition state and attempts at measuring a signal of an optical fiber transmitting the quantum entangled particles may lead to collapse of the quantum entangled particles out of the superposition state. Thus, attempts to split the quantum entangled particles over multiple lines in order to provide redundancy may be frustrated by the inability to measure signal strength on optical fibers transmitting the quantum entangled particles. However, by using a first optical fiber to distribute quantum entangled particles, as described herein, and using a second optical fiber to distribute service channel information, the quantum entanglement distribution system, as described herein, is able to quickly identify a loss of signal power in the first or second optical fiber. For example, a loss of signal power may be identified based on an interruption of the distribution of the quantum entangled particle or based on signal power measurements of the optical fiber distributing the service channel information. However, in this arrangement it is not necessary to measure a signal strength of the optical fiber distributing the quantum entangled particles in order to ensure the viability of a spare optical fiber to transmit the quantum entangled particles in the event of a failure of a main optical fiber.

In some embodiments, quantum entangled particles may be used to distribute quantum encrypted information, such as performing quantum key distribution (QKD). Also, in some embodiments quantum key distribution (QKD) may be used to form quantum safe enclaves. In some embodiments, a quantum safe enclave comprises computing and/or data storage resources that are connected via quantum safe network links. The quantum safe network links are established using quantum key distribution mechanisms that are protected against eavesdropping or alterations of communications. These securely distributed keys, which may also be referred to as secure shared randomness, are used to encrypt communications communicated via the quantum safe network links. In some embodiments, quantum key distribution (QKD) is used to establish quantum safe network links between directly connected facilities, such as data centers of a service provider network or customers with direct connections to data centers of a service provider network. Established quantum safe network links between directly connected data centers, which may also be referred to as quantum key distribution (QKD) links, are then used to propagate secure shared randomness (e.g., symmetric encryption keys) to non-directly connected data centers that are connected via one or more intermediate data centers connected with one another via quantum safe network links (e.g., QKD links).

In some embodiments, quantum safe network links are established by distributing secure shared randomness (e.g., random bits that can be used as encryption material) to both parties at ends of a conventional link that is to be used to establish a quantum safe network link. In some embodiments, the secure shared randomness may be distributed in a secure way using quantum entanglement or other secure quantum distribution mechanisms. For example, both parties at the ends of the link may be distributed respective particles that are quantum entangled. Measurements may be performed by both parties using the entangled particles to generate bits of secure shared randomness. Because both parties hold the entangled particles, the bits determined by each party via the measurements of the entangled particles will be the same, or one party can determine the bit measured by the other. However, the physical properties of the quantum entangled particles prevent any third-party from intercepting the bits being communicated without the parties holding the entangled particles being made aware of the third-party attempt to intercept the communication. In this way, random information can be shared between the two parties holding the entangled particles in a secure way that prevents interception or alteration by others.

Using distributed entangled particles to distribute secure shared randomness (e.g., encryption keys) is an example of quantum key distribution (QKD). As mentioned above, secure QKD links established between facilities for which it is possible to share quantum entanglement may be used to establish quantum safe network links between other facilities for which it is not possible to directly share quantum entanglement. For example, additional quantum safe network links between facilities that do not share quantum entanglement may be established via the QKD links established between facilities that are capable of sharing quantum entanglement. The additional quantum safe network links may be established using encapsulated communications via the already established QKD links. For example, consider three data centers, data center A, data center B, and data center C, wherein data center B is a middle data center that is connected to data centers A and C on either side of the middle data center, data center B, via QKD links. Thus, there is a QKD link between data center A and data center B and another QKD link between data center B and data center C. However, there is no direct QKD link between data center A and data center C. In such a situation, a quantum safe network link may be established between data center A and data center C via key propagation and encapsulation. For example, data center A may send secure shared randomness to data center C via the intermediate QKD links between data center A and B and between data center B and C, wherein secure shared randomness shared between the respective data centers sharing QKD links (e.g., data centers A and B and data centers B and C) is used to encrypt the secure shared randomness being sent to data center C from data center A when traversing the respective intermediate QKD links from A to B and from B to C.

Note that quantum safe network links, as described herein, use secret symmetric encryption keys. These keys are distributed in a way in which the security of the distribution does not rely on assumptions about computational complexity, but is instead based on the physical properties of quantum systems or the secure distribution of information using tamper-resistant storage devices.

At the hardware layer, quantum key distribution (QKD) works between any two network points with access to a communication channel that supports transmission of quantum-level optical signals, e.g., an optical fiber or a free-space (satellite) link. To establish a symmetric key, one of the parties generates a random classical bit and encodes it into a quantum state of a photon. When the second party receives the photon, it measures the photon's state, randomly choosing its measurement basis. The laws of quantum mechanics dictate that if the second party guesses the measurement basis correctly (i.e., guesses the encoding basis) then the two parties will end up with the same random classical bit. Any attempt by a malicious third party to intercept and learn the quantum state of transmitted photons will result in excess channel noise detectable by the communicating parties, prompting the parties to re-start the process. Quantum safe enclaves use this shared randomness with existing cryptographic infrastructure, providing a QKD-enabled end-to-end quantum-safe cryptography solution. In some embodiments, secure shared randomness (e.g., QKD keys) are distributed to data centers with a combination of fiber and satellite links. These keys are available for customer use and are also used to encrypt inter-data-center links. This protects customers against record and decrypt attacks in which a malicious party taps a communication channel, records the encrypted communications and waits for sufficiently advanced technology to be available for decryption.

In some embodiments, post quantum cryptography (PQC) is used for communication channels within a data center at a trusted service provider network site. Post-quantum cryptography (PQC) uses classical encryption algorithms that are believed to be resistant against attacks by quantum computers. In contrast, QKD enables the generation and sharing of a secret random number (key) in a quantum-safe manner using the physical properties of quantum systems. PQC security is based on the difficulty of solving a mathematical problem providing what is known as "computational security". QKD security is based on "information theoretic security", that is, there are no underlying assumptions on the computational capabilities (whether classical or quantum) of current or future hardware. The two technologies complement and augment each other in the context of quantum security and may both be used to implement portions of a quantum safe enclave. For example, QKD is used to distribute secure symmetric keys over channels that are outside the secure perimeters of a data center. PQC, being software based, is used for cryptographic tasks in complex topologies such as inside a data center running virtualized computing or storage instances. Combining the two technologies provides protection against developments in cryptoanalysis and results in a more resilient, as well as quantum-safe, cryptographic stack.

In some embodiments, secure shared randomness distributed via quantum safe network links is used to supply symmetric keys to other encryption protocols, such as transport layer security (TLS), internet protocol security (IPSec), media access control security (MacSec), virtual private networks (VPNs), etc. Many of these protocols already have a built in pre-shared key (PSK) mechanism that can take advantage of secure shared randomness distributed via quantum safe network links of a quantum safe enclave.

FIG. 1 illustrates a service provider network comprising data centers located at a source site and a receiver site, wherein dual fiber optic paths with optical line protection are used to distribute quantum entanglement from the data center at the source site to the data center at the receiver site, according to some embodiments.

Figure 7:
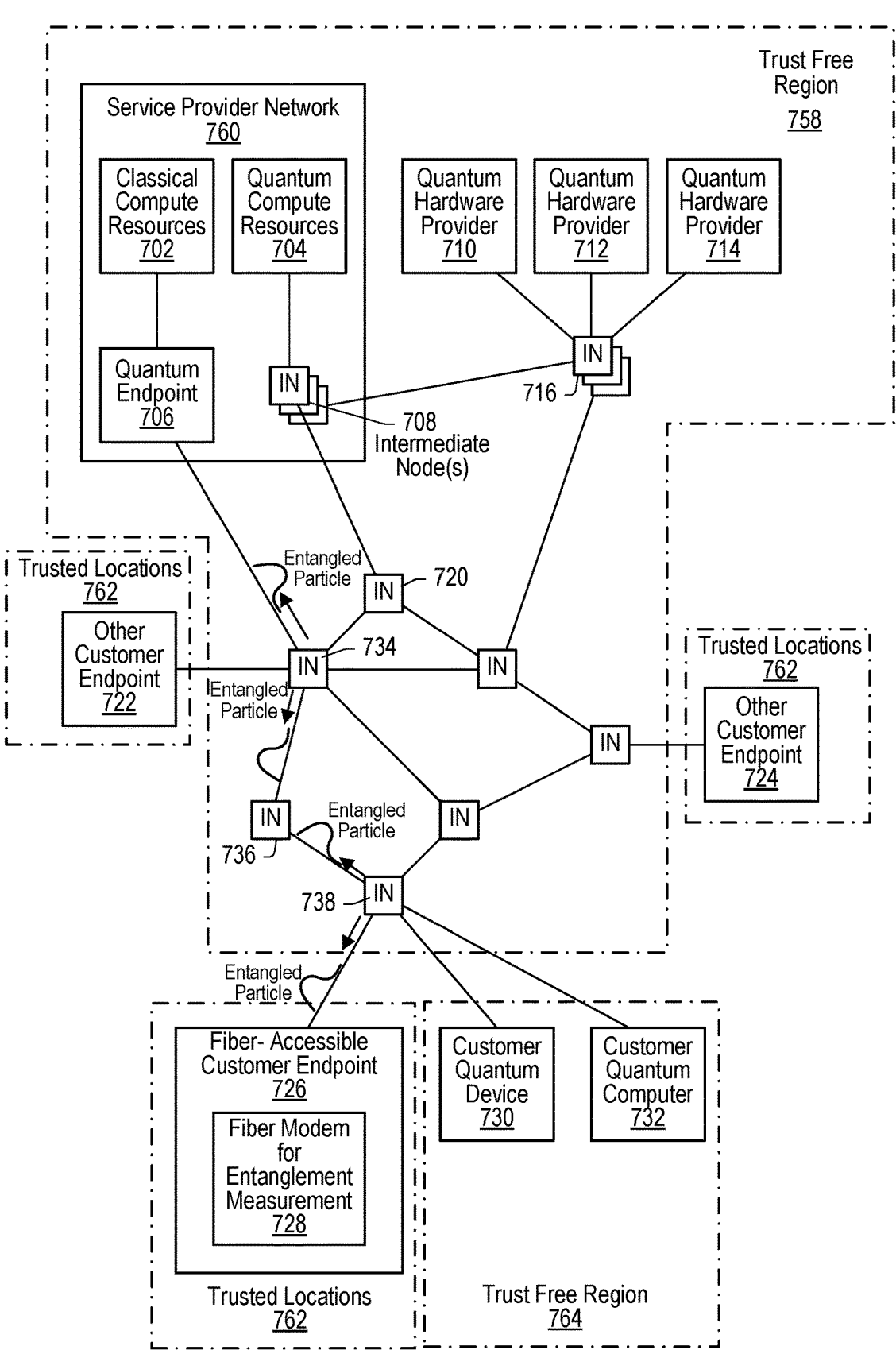
FIG. 7 illustrates resources of a service provider network that provide quantum entanglement distribution to customer endpoints connected to intermediate nodes in a trust-free region outside of the trusted locations of the service provider network, wherein optical line protection is used to distribute the quantum entanglement, according to some embodiments.

In some embodiments, provider network 102 includes source site 104 and receiver site 106. In some embodiments, the source site 104 may be a data center 108 and the receiver site 106 may be a data center 110. In some embodiments, a receiver site may be at a customer location, outside of service provider network 102, such as shown in FIG. 7. Note that FIG. 1 illustrates example source and receiver sites within a provider network, however quantum entanglement distribution using optically protected fiber optic pathways, as described herein, may be performed between various types of source and receiver sites.

In some embodiments, source site 104 (e.g., data center 108) includes an entangled pair source node 112 that generates entangled quantum particles. The entangled pair source node 112 may provide a first one of the entangled quantum particles of a given entangled pair to a local entanglement storage (e.g., quantum memory) and/or quantum measurement device 114. The entangled pair source node 112 may further provide a second one of the entangled particles of the given entangled pair for distribution to a receiver site via a quantum entanglement distribution system, such as shown in FIG. 1, e.g., such as to receiver site 106. In some embodiments, instead of holding the first one of the particles of the given entangled particle pair, source site 104 may be a source for two receiver sites and may provide the first quantum entangled particle of the given entangled pair to a first receiver site and provide the second quantum entangled particle of the given entangled pair to a second receiver site. For example, an additional set of optical fibers may connect source site 104 to a second receiver site (not shown in FIG. 1).

In some embodiments, the quantum entangled particles to be distributed from source site 104 to receiver site 106 may be distributed using optically protected fiber optic pathways, such as fiber optic pathways 140 and 142. In some embodiments, optical protection may be provided by concurrently using both optic pathways 140 and 142, at the same time, in the communication of quantum entangled particles, but dividing the signals into a quantum entangled particle channel that is routed via a first one of the optical pathways, such as optical pathway 140 and a second service channel that is routed via a second one of the optical pathways, such as optical pathway 142. By separating out the quantum entangled particle channel and the service channel, this allows continuous monitoring of a "spare" pathway for the quantum entangled particle distribution via measurement and monitoring of the service channel information. This also avoids a need to directly measure the quantum entangled particle channel. Instead, the receiving site can detect a failure of the fiber optic pathway distributing the quantum entangled particles due to a loss of transmission of the quantum entangled particles. Also, both the receiver site 106 and the source site 104 can detect a failure of the optical pathway transmitting the service channel information, for example due to a stoppage of transmission of the service channel information.

In some embodiments, the service channel information is bi-directional between the source site 104 and the receiver site 106. Said another way source site 104 sends service channel information to receiver site 106 and receiver site 106 also sends service channel information to source site 104.

In some embodiments, source site 104 further includes entanglement distribution controller 116, which may be implemented using computing resources at the source site 104, such as computing resources of data center 108. The entanglement distribution controller 116 receives information from entanglement/storage measurement device 114, such as timing information for the distributed quantum entangled particles (e.g., how far apart in time are the distributed quantum particles spaced from one to another), measurement basis information for the quantum entangled particles, Bell states for the quantum entangled particles (for example if Bell state transformation has been applied at the entangled pair source node 112), etc. This service channel information may be communicated to receiver site 106 via (in a normal state) second fiber optic pathway 142, but may be alternatively communicated to receiver site 106 along with the quantum entangled particles via first fiber optical pathway 140, for example in response to a failure associated with fiber optic pathway 142. Alternatively, the quantum entangled particles can be communicated with the service channel information via second fiber optic pathway 142, for example in response to a failure of the first fiber optical pathway 140.

In some embodiments, the entangled quantum particles and the service channel information may be communicated at different wavelengths via a shared fiber optical pathway (e.g., 140 or 142). In some embodiments, the service channel information may further be communicated using different wavelengths, such as a first wavelength for communications from source site 104 to receiver site 106, and a second wavelength for communications from receiver site 106 to source site 104. Moreover, the quantum entangled particles may be transmitted using a third wavelength that is different than the first and second wavelengths.

Additionally, entanglement distribution controller 116 may receive signal power measurements from power detectors 122, 124, and 126 and use these power measurements to detect a failure of fiber optical pathway 140 or 142 based on a loss of signal power for service channel information being communicated via a respective one of the fiber optical pathways 140 or 142. In response, entanglement distribution controller 116 may cause switch 120 to re-route the service channel information to be routed over a different optical pathway.

Also, entanglement distribution controller 116 may receive, for example in the service channel information, a notice that quantum entanglement communication to the receiver site 106 has been lost. This update included in the service information may be received via a given one of the optical pathways, such as optical pathway 140. In response, the entanglement distribution controller 116 may cause switch 118 to re-route the quantum entanglement distribution to take place on a same fiber optical pathway as the communication of the service channel information. In some embodiments, the indication of the loss of communication of the quantum entangled particles may be indicated using a message transmitted over the service channel. Additionally or alternatively, the service channel information flow may be purposefully interrupted for a set time (e.g., X seconds) as a way of indicating the loss of quantum entanglement communication and the need for the source site quantum entanglement distribution controller to initiate a switchover to a spare fiber optical pathway capable of transmitting both the service channel information and the quantum entangled particles.

In some embodiments, the service channel information and the entangled quantum particles (being communicated at different frequencies) may be multiplexed via MUX 146 or 148 and may be de-multiplexed via DEMUX 150 or 152.

Receiver site 106 also includes entanglement storage and/or measurement device 128, which may store and/or measure quantum particles received from source site 104. In some embodiments, entanglement storage and/or measurement device 128 may provide measurement basis information to entanglement distribution controller 130, which may send the measurement basis information to source site 104. For example, when the distributed quantum entanglement is used to distribute quantum encryption keys (e.g., quantum key distribution QKD), then the source site and the receiver site may only extract shared quantum randomness from entangled pairs that were measured in the same measurement basis at both the source site and the receiver site. And, in order to know which entangled pairs were measured in the same measurement basis, source site 104 and/or receiver site 106 needs to communicate to the other site which measurement basis was used at the respective site. Also, the timing information exchanged in the service channel may enable the source site and the receiver site to match up received quantum entangled particles as being particles of same respective entangled pairs.

In a similar manner to source site 104, receiver site 106 includes power detectors 134, 136, and 138 that monitor service channel information signal strength. Also, entanglement distribution controller 130 controls switch 132 to re-route the outgoing service channel information in response to a fiber optic pathway failure.

Figure 2A:
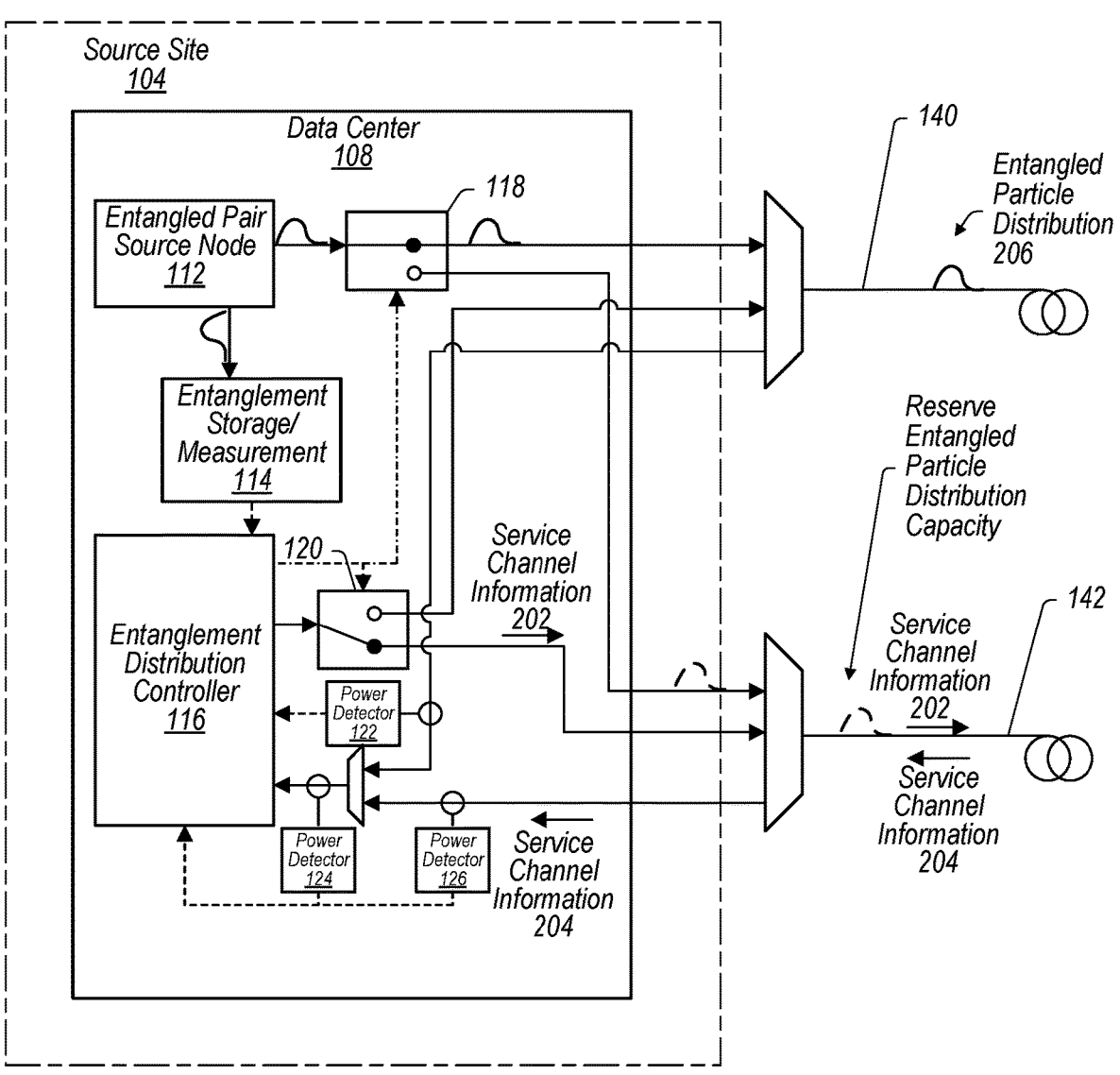
FIG. 2A illustrates a normal state configuration of a source site of a quantum entanglement distribution system, wherein dual fiber optic paths with optical line protection are used to distribute quantum entanglement from the source site to a receiver site, according to some embodiments.

FIG. 2A illustrates a normal state configuration of a source site of a quantum entanglement distribution system, wherein dual fiber optic paths with optical line protection are used to distribute quantum entanglement from the source site to a receiver site, according to some embodiments.

For example, in a "normal" (e.g., no failure) state, then entangled quantum particles and the service channel information may be routed for distribution using different ones of fiber optical pathways 140 and 142. Note that each of fiber optical pathways 140 and 142 are configured to distribute the quantum entangled particles (and the service channel information). However, by separating the service channel information 202 and 204 from the entangled particle distribution 206, on going power measurements can be made for the "spare" optical pathway 142 to ensure it is a viable spare in the event of a failure associated with fiber optical pathway 140.

Figure 2B:
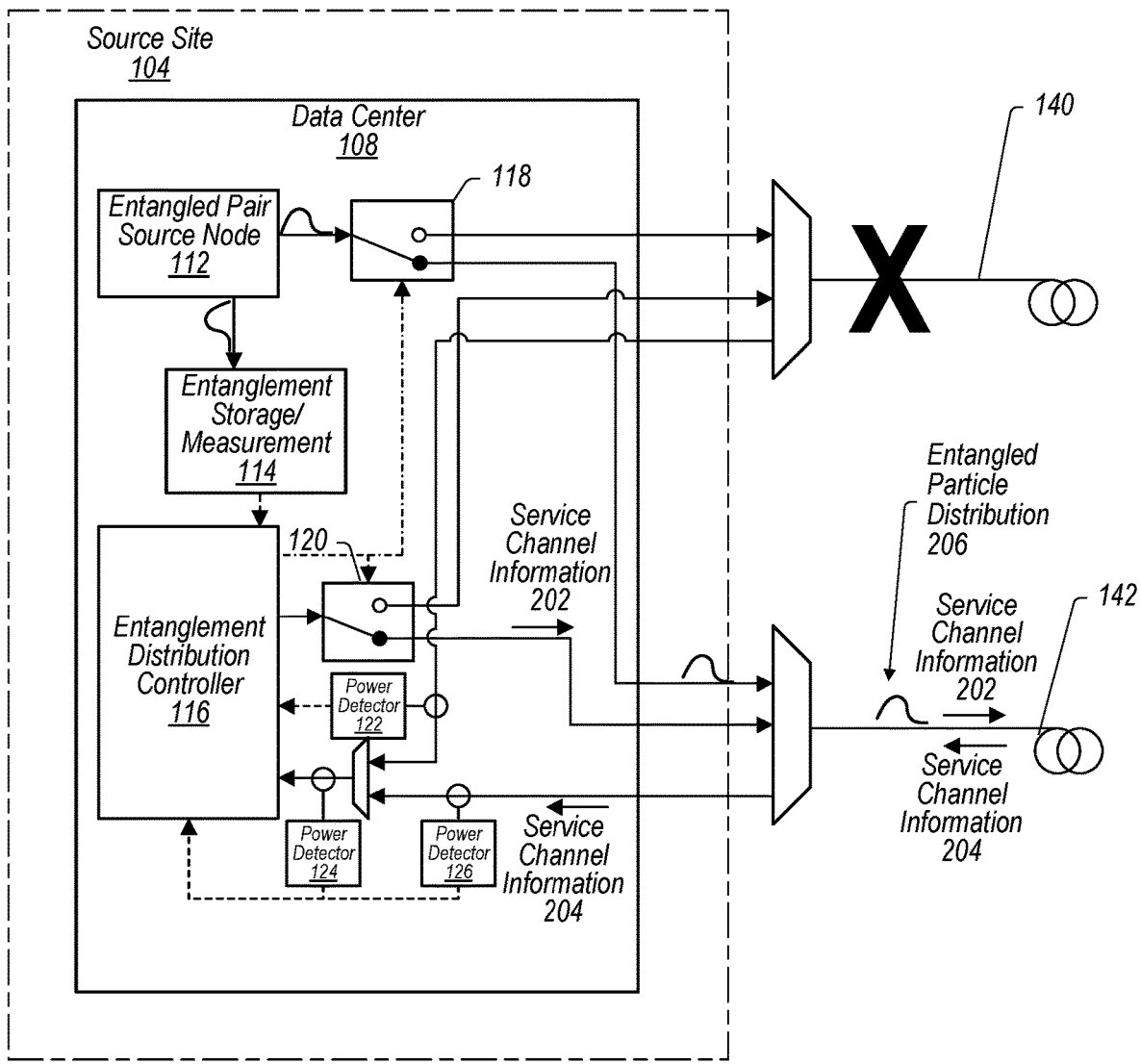
FIG. 2B illustrates a first one of the dual fiber optic paths with optical line protection in a failure state and a resulting configuration at the source site of the quantum entanglement distribution system, wherein an entanglement distribution controller automatically re-routes the quantum entanglement to be distributed along with service channel information using a second one of the dual fiber optic paths with optical line protection, according to some embodiments.

FIG. 2B illustrates a first one of the dual fiber optic paths with optical line protection in a failure state and a resulting configuration at the source site of the quantum entanglement distribution system, wherein an entanglement distribution controller automatically re-routes the quantum entanglement to be distributed along with service channel information using a second one of the dual fiber optic paths with optical line protection, according to some embodiments.

For example, in response to a failure associated with fiber optical pathway 140, quantum entanglement distribution may be (momentarily) interrupted. This interruption may be detected at receiver site 106 and communicated back to source site 104 via service channel information 204. In response to receiving this indication of a loss of quantum entangled particle distribution, entanglement distribution controller 116 may cause switch 118 to change positions to roue quantum entangled particle distribution 206 via fiber optical pathway 142.

Figure 2C:
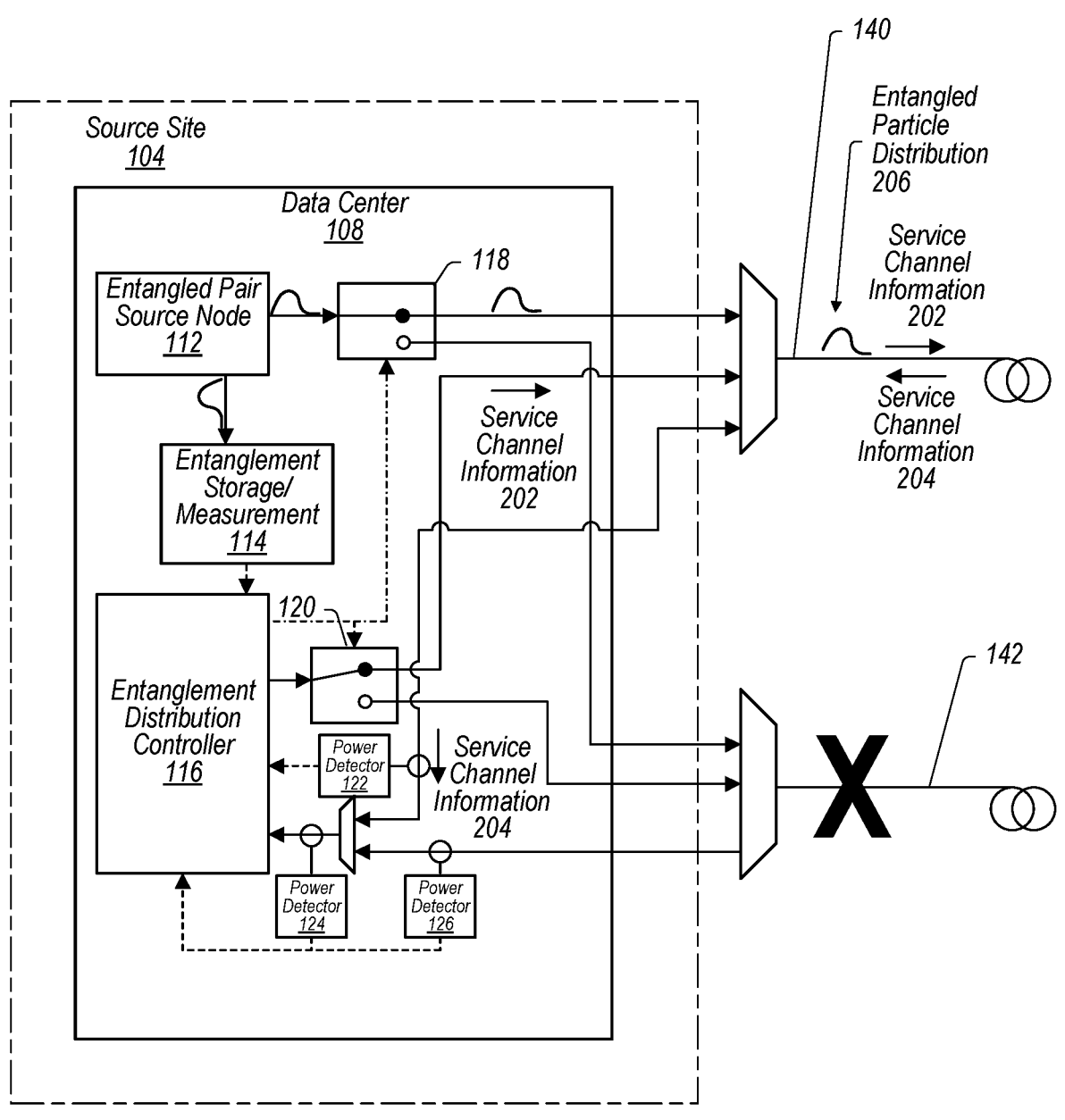
FIG. 2C illustrates a second one of the dual fiber optic paths with optical line protection in a failure state and a resulting configuration at the source site of the quantum entanglement distribution system, wherein an entanglement distribution controller automatically re-routes the service channel information to be distributed along with the quantum entanglement distribution using the first one of the dual fiber optic paths with optical line protection, according to some embodiments.

FIG. 2C illustrates a second one of the dual fiber optic paths with optical line protection in a failure state and a resulting configuration at the source site of the quantum entanglement distribution system, wherein an entanglement distribution controller automatically re-routes the service channel information to be distributed along with the quantum entanglement distribution using the first one of the dual fiber optic paths with optical line protection, according to some embodiments.

As another example, fiber optical pathway 142 may have an associated failure. This failure may be detected via power detectors 122, 124, and/or 126 that measure optical signal strength of communications received via fiber optical pathway 142. In response to detecting a power level below a threshold value, entanglement distribution controller 116 may cause switch 120 to change positions to route outgoing service channel information 202 via fiber optical pathway 140, along with entangled particle distribution 206. In a similar manner as discussed in FIG. 3C, the entanglement distribution controller 130 at the receiver site 106 may also detect a signal strength below the threshold value via power detectors 134, 136, and 138. In response entangled distribution controller 130 may cause the service channel information 204 (sent to the source site from the receive site) to be re-routed to flow over fiber optic pathway 140.

In response to the signal strength of optical pathway 142 being restored to greater than the threshold level, entanglement distribution controller 116 and entanglement distribution controller 130 may re-route the service channel information back to the "spare" fiber optical pathway 142. This is also described in FIG. 10.

Figure 3A:
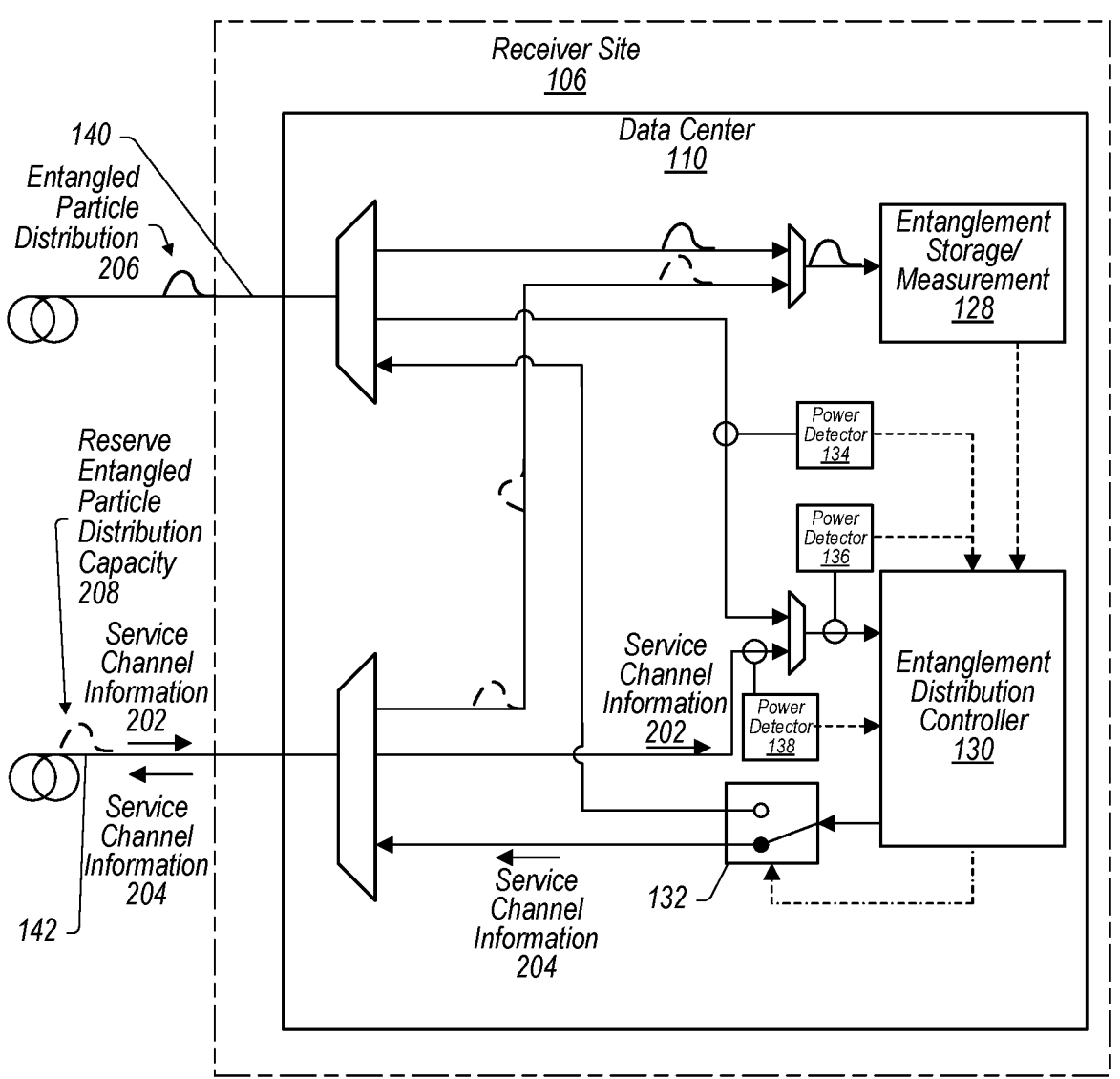
FIG. 3A illustrates a normal state configuration of a receiver site of a quantum entanglement distribution system, wherein dual fiber optic paths with optical line protection are used to distribute quantum entanglement from a source site to the receiver site, according to some embodiments.

FIG. 3A illustrates a normal state configuration of a receiver site of a quantum entanglement distribution system, wherein dual fiber optic paths with optical line protection are used to distribute quantum entanglement from a source site to the receiver site, according to some embodiments.

In a similar manner to FIG. 2A, in the "normal" (e.g., no failure) state, switch 132 may be positioned to route the outgoing service channel information 204 via optical pathway 142 and the entangled quantum particles may be received via optical pathway 140. Thus, entangled particle distribution 206 and service channel information 202 and 204 are carried out over different optical pathways. In this way, optical pathway 142 is maintained as continuously monitored reserve entangled distribution capacity 208.

Figure 3B:
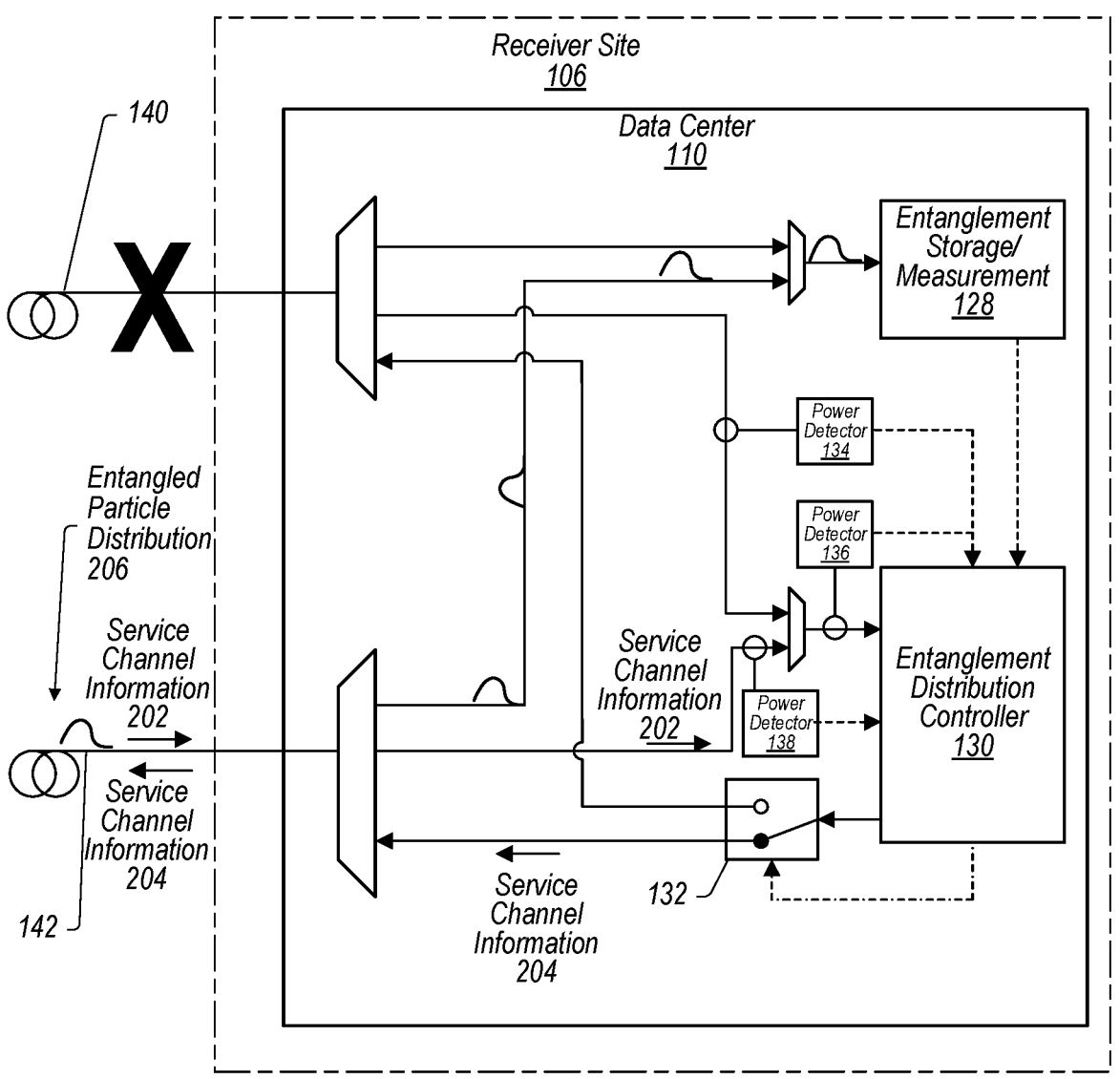
FIG. 3B illustrates a first one of the dual fiber optic paths with optical line protection in a failure state and a resulting configuration at the receiver site of the quantum entanglement distribution system, wherein an entanglement distribution controller automatically re-routes the quantum entanglement to be distributed along with service channel information using a second one of the dual fiber optic paths with optical line protection, according to some embodiments.

FIG. 3B illustrates a first one of the dual fiber optic paths with optical line protection in a failure state and a resulting configuration at the receiver site of the quantum entanglement distribution system, wherein an entanglement distribution controller automatically re-routes the quantum entanglement to be distributed along with service channel information using a second one of the dual fiber optic paths with optical line protection, according to some embodiments.

FIG. 3B shows the receiver site corollary to what is shown in FIG. 2B for the source site. For example, in response to a failure of optical pathway 140, receiver site 106 may start to receive entangled particle distribution 206 via optical pathway 142, along with receiving service channel information 202 over optical pathway 142 and routing outgoing service channel information 204 via optical pathway 142.

Figure 3C:
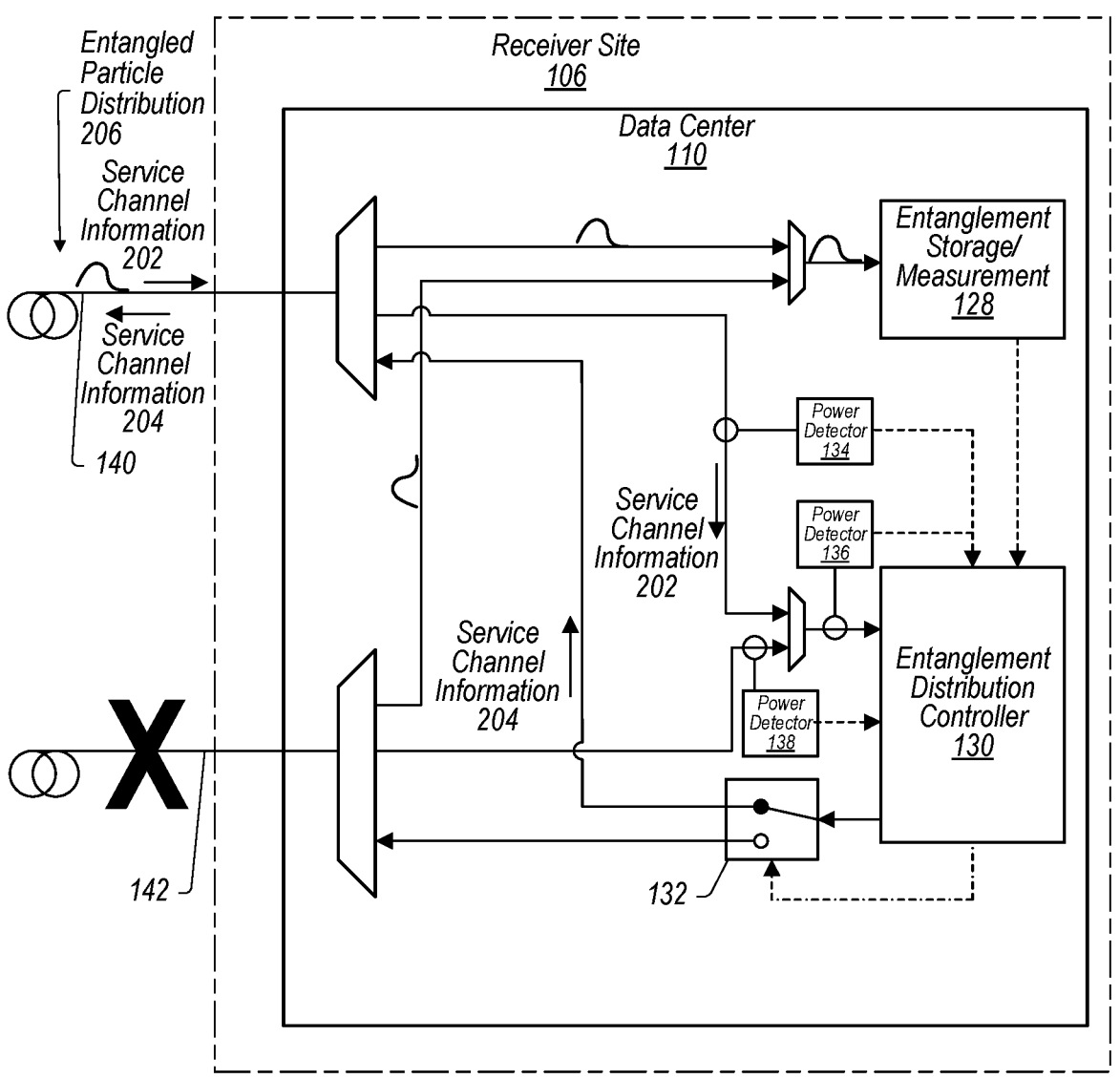
FIG. 3C illustrates a second one of the dual fiber optic paths with optical line protection in a failure state and a resulting configuration at the receiver site of the quantum entanglement distribution system, wherein an entanglement distribution controller automatically re-routes the service channel information to be distributed along with the quantum entanglement distribution using the first one of the dual fiber optic paths with optical line protection, according to some embodiments.

FIG. 3C illustrates a second one of the dual fiber optic paths with optical line protection in a failure state and a resulting configuration at the receiver site of the quantum entanglement distribution system, wherein an entanglement distribution controller automatically re-routes the service channel information to be distributed along with the quantum entanglement distribution using the first one of the dual fiber optic paths with optical line protection, according to some embodiments.

FIG. 3C shows the receiver site corollary to what is shown in FIG. 2C for the source site. For example, in response to a failure of optical pathway 142, receiver site 106 may continue to receive entangled particle distribution 206 via optical pathway 140. But may begin to receive service channel information 202 via optical pathway 140 and entanglement distribution controller 130 may cause switch 132 to route outgoing service channel information 204 via optical pathway 140.

Figure 4:
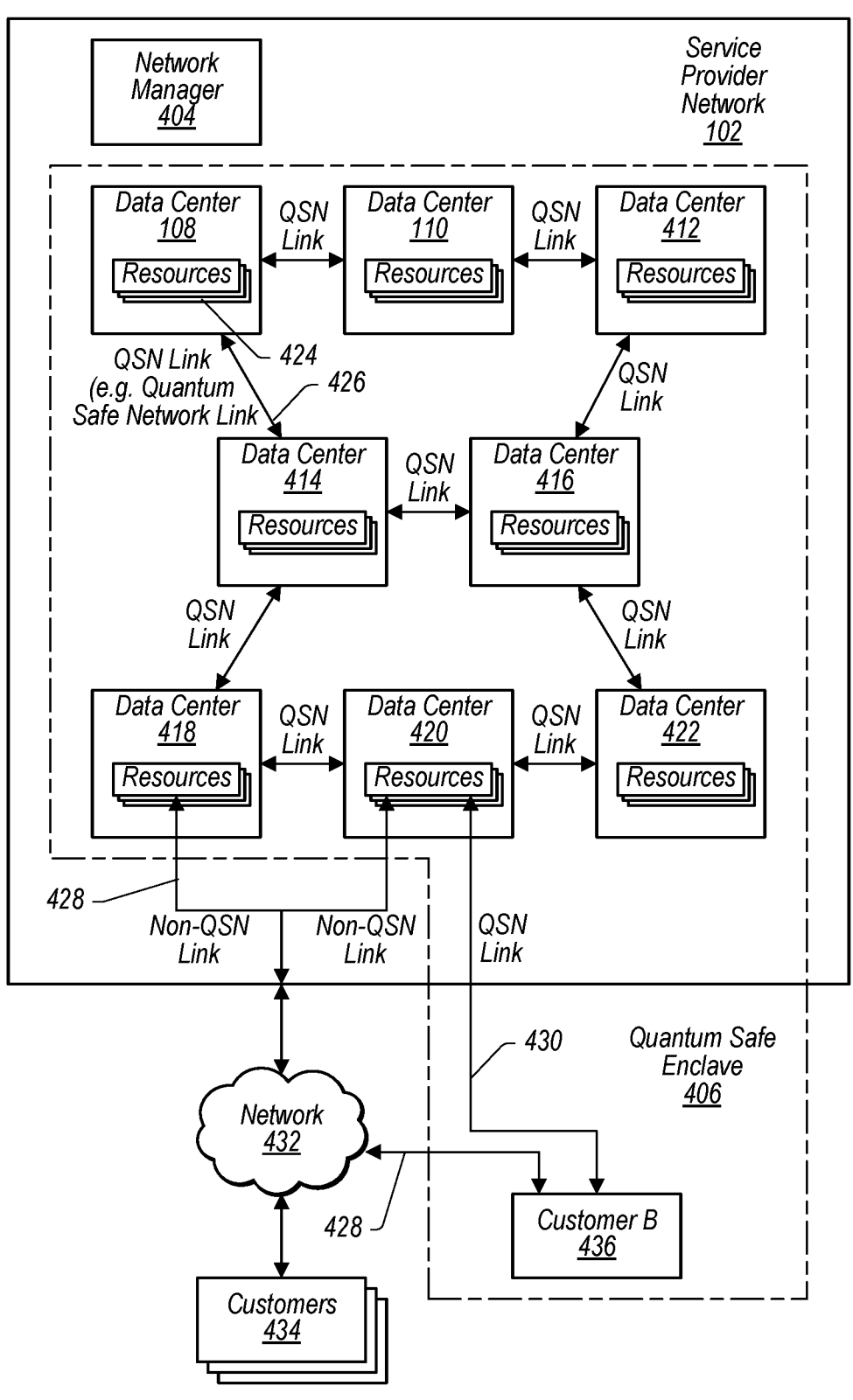
FIG. 4 illustrates quantum safe network links implemented using quantum entanglement distribution with optical line protection, wherein a service provider network comprises quantum safe network links that implement a quantum safe enclave, and wherein a quantum safe network link is extended out of the service provider network to a customer resource to include the customer resource in the quantum safe enclave, according to some embodiments.

FIG. 4 illustrates quantum safe network links implemented using quantum entanglement distribution with optical line protection, wherein a service provider network comprises quantum safe network links that implement a quantum safe enclave, and wherein a quantum safe network link is extended out of the service provider network to a customer resource to include the customer resource in the quantum safe enclave, according to some embodiments.

In some embodiments, a quantum safe enclave, such as quantum safe enclave 406, is established using quantum safe network links, such as quantum safe network (QSN) links 426, which connect data centers 108, 110, 412, 414, 416, 418, 420, and 422 of service provider network 102. In some embodiments, each of the quantum safe network (QSN) links 426 is implemented using a quantum entanglement distribution system with optical line protection, such as illustrated in FIGS. 1-3. Additionally, in some embodiments, a customer, such as customer 436 may be connected to a data center of a service provider network, such as data center 420 via QSN link 430. In some embodiments, quantum safe network (QSN) link 430 may be implemented using dual direct connect links established between the customer 436 and service provider network 102, and the dual direct connect links may further be configured to perform quantum entanglement distribution with optical line protection. For example, data center 110 shown in FIG. 1 may be located at premises of customer 436.

In some embodiments, data centers 108, 110, 412, 414, 416, 418, 420, and 422 include resources 424, which may include various types of resources that may be allocated for use by customers 434 and 436, such as virtualized computing or storage resources, bare metal computing resources, other services, such as networking services, machine learning services, database services, etc.

In some embodiments, network manager 404 causes QSN links 426 to be established using various methods as further described herein. Additionally, network manager 404 is configured to enforce one or more policies that limit communications to or from computing or data storage resources within a quantum safe enclave, such as quantum safe enclave 406, to transmission via respective ones of the quantum safe network links 426. For example, data stored in resources 424 in data center 420 that are included in quantum safe enclave 406 may not be permitted to be transmitted via a public network, such as network 432, and instead may be transmitted via QSN link 430 to customer 436. Alternatively, in some embodiments, customer 436 and resources 424 in data center 420 may exchange secure shared randomness (e.g., encryption material) via a quantum secure mechanism to establish QSN link 430 that is within quantum safe enclave 406. Also, the exchanged secure shared randomness may be used to generate one time encryption keys used to encrypt customer data to be sent via network 432. For example, in some embodiments, there may be greater capacity on network 432 to transmit data than is available via QSN link 430. Thus, a QSN link, such as QSN link 430, may be used to exchange symmetric encryption keys, and then the higher capacity non-QSN links 428 may be used to transmit quantum safe encrypted data.

In some embodiments, quantum key distribution (QKD) is used to establish QSN links between adjacent data centers. Also, within a given data center post quantum cryptography (PQC) may be used to distribute secure shared randomness within the data center between a connection to the QKD link and a given resource within the data center, such as a compute or storage resource. The distributed secure shared randomness may then be used by the given resource to encrypt communications to be sent over non-QSN links 428, such as between customer B (436) and resources in data centers 418 or 420, via network 432. The distributed secure shared randomness may then be used to create an effective quantum safe network (QSN) channel via the non-QSN links 428.

Figure 5:
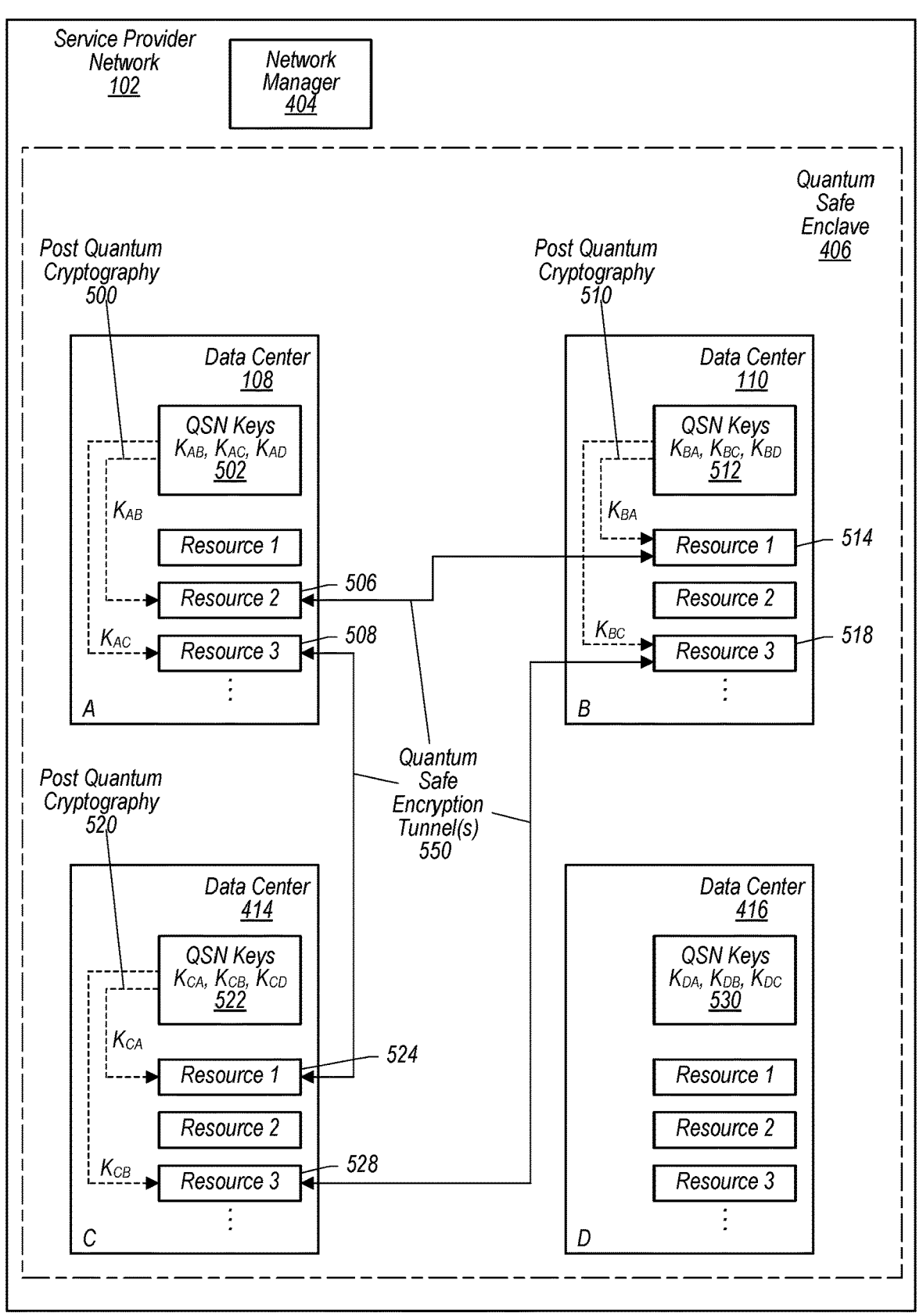
FIG. 5 illustrates additional details regarding quantum safe network links that are extended to resources within a data center using post quantum cryptography (PQC), according to some embodiments.

FIG. 5 illustrates additional details regarding quantum safe network links that are extended to resources within a data center using post quantum cryptography (PQC), according to some embodiments.

In some embodiments, at a given trusted node, such as data centers 108, 110, 414, and 416 (for simplicity referred to in the following discussion as data centers A, B, C, and D), QSN keys may be stored at a main location, such as locations 502, 512, 522, and 530, respectively in data centers A, B, C, and D. As can be seen each data center main location may store keys for communicating with other ones of the data centers. For example, data center A holds a key for communication with data center B ($K_{AB}$), a key for communicating with data center C ($K_{AC}$), and a key for communicating with data center D ($K_{AD}$). In some embodiments, a given resource in a given data center may wish to communicate with another given resource in another given data center in a quantum safe manner. For example, resource 506 of data center A may request to communicate with resource 514 of data center B. In such a situation, key $K_{AB}$ may be provided to resource 506 from main key storage location 502 of data center A using post quantum cryptography 500. Likewise, at data center B, key $K_{BA}$ may be provided to resource 514 from main key storage location 512 using post quantum cryptography 510. Once both resource 506 at data center A and resource 514 at data center B have the appropriate keys (e.g., keys $K_{AB}$ and $K_{BA}$) that were distributed using quantum safe network links/QKD links, resources 506 and 514 may encrypt and decrypt communications in a quantum safe manner. For example, the resources may communicate via a quantum safe encryption tunnel 550.

In a similar manner, resource 508 of data center A and resource 524 of data center C may communicate via quantum safe encryption tunnels 550 using respective keys provided from main key storage locations 502 and 522 via post quantum cryptography 500 and 520. Additionally, resource 528 of data center C and resource 518 of data center B may communicate using quantum safe encryption tunnels 550, in a similar manner.

In some embodiments, various post quantum cryptography protocols, which may be public-key algorithms, are used to encrypt communications within a trusted node. The post quantum cryptography (PQC) algorithms are designed to be secure against a cryptanalytic attack by a quantum computer.

Figure 6:
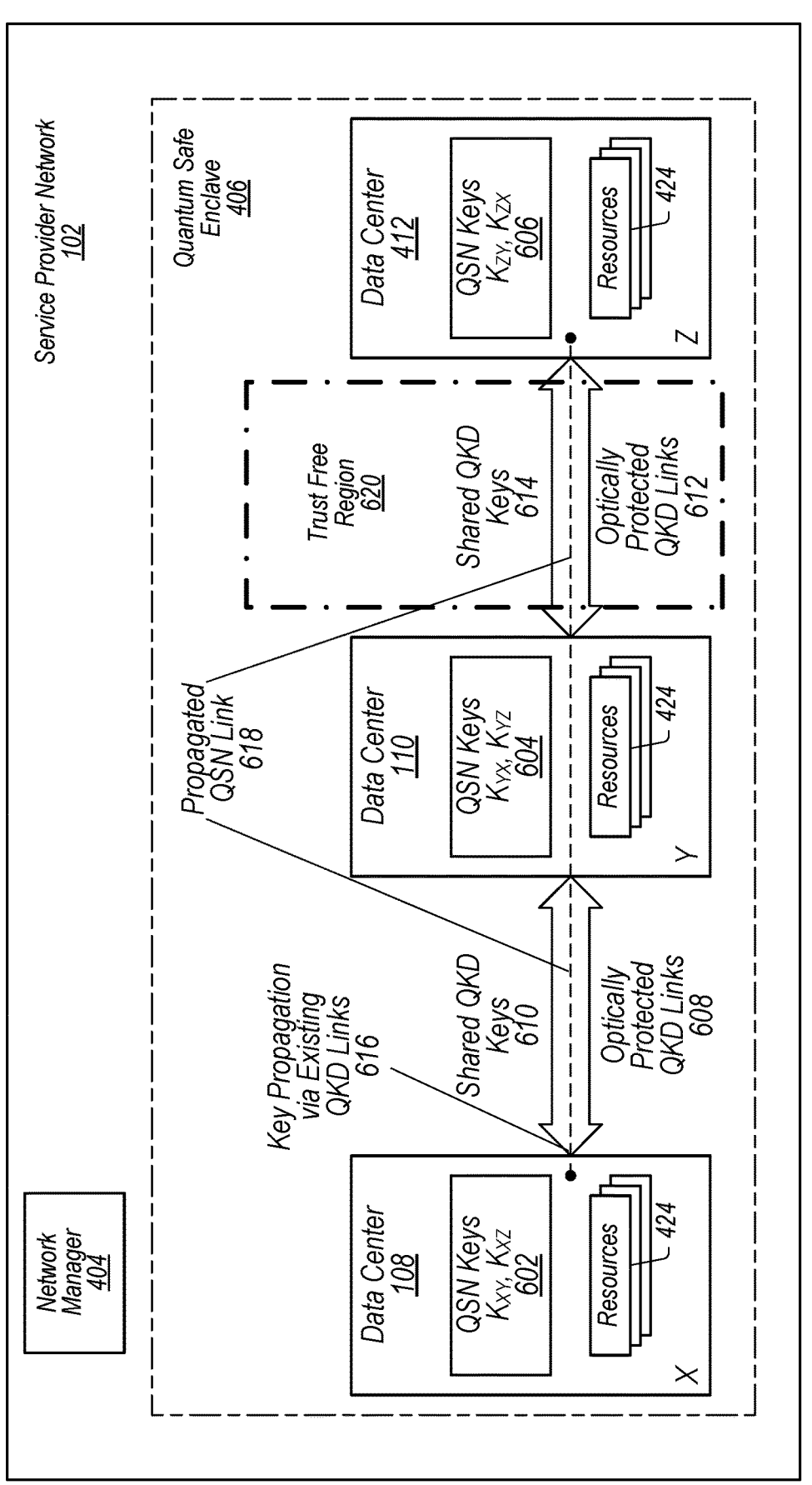
FIG. 6 illustrates additional details regarding key propagation between non-directly connected data centers in order to establish quantum safe network (QSN) links between the non-directly connected data centers, according to some embodiments.

FIG. 6 illustrates additional details regarding key propagation between non-directly connected data centers (e.g., data centers not having QKD links directly connecting the data centers) in order to establish quantum safe network (QSN) links between the non-directly connected data centers, according to some embodiments.

In some embodiments, physical QKD links, such as optically protected QKD links 608 and 612 may be used to exchange shared QKD keys 610 and 614 between directly connected data centers such as data centers X and Y (e.g., data center 108 and data center 110) and data centers Y and Z (e.g., data center 110 and data center 412). The shared QKD keys may then be used to propagate keys between non-directly connected data centers. For example, data center X and Z may exchange keys Kxz and Kzx via QKD links 608 and 612 to establish propagated QSN link 618 between data centers X and Z.

In some embodiments, physical QKD links, such as optically protected QKD link 612, may pass through a trust-free region, such as trust-free region 620, between data centers, such as between data centers 110 and 112. However, due to the physical nature of the distributed entanglement used to establish the QKD link, such links may be protected from attack even if passing through trust-free regions beyond the control of the service provider network 102.

Figure 8:
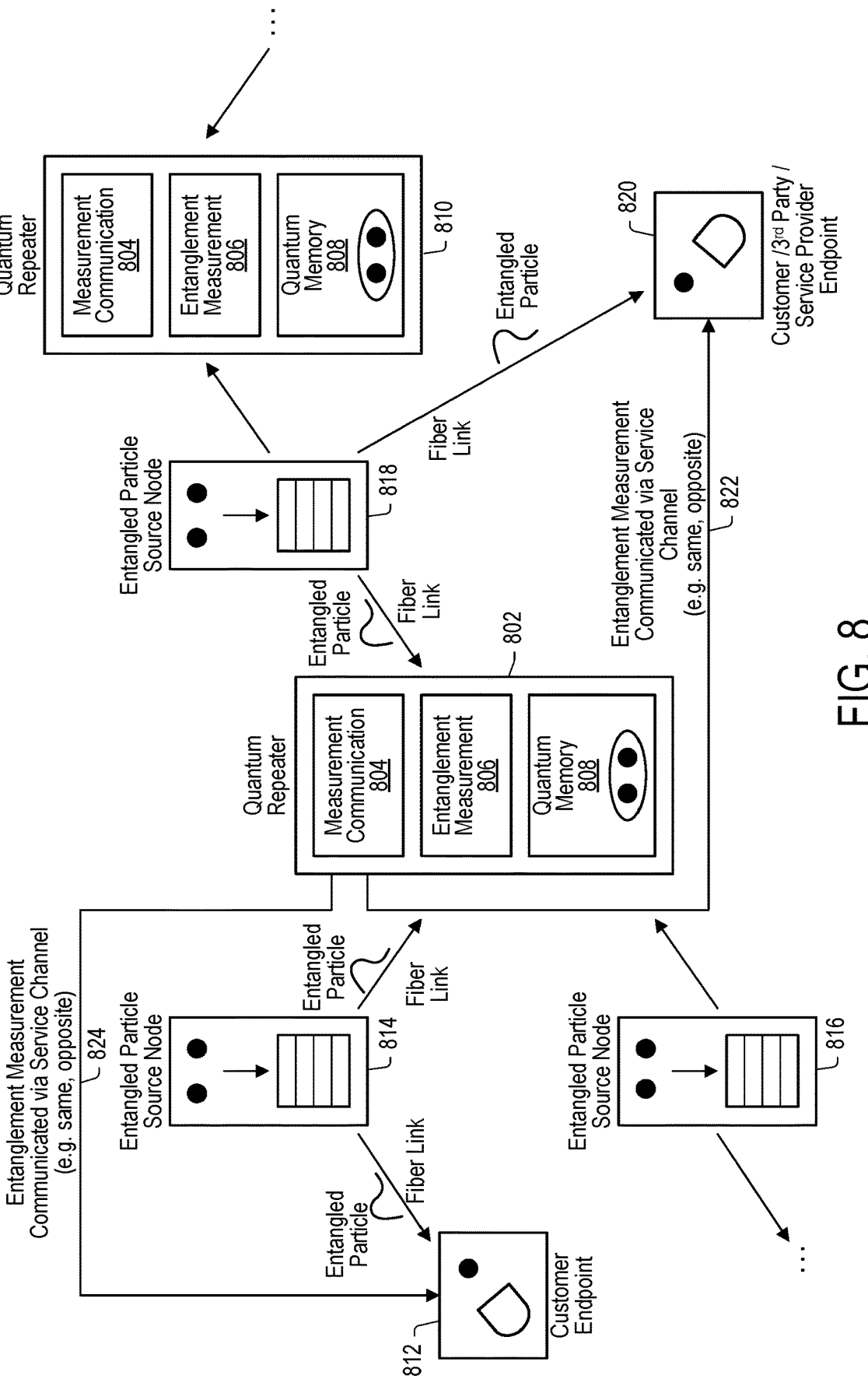
FIG. 8 illustrates intermediate nodes (that act as source and/or receiver sites) used in entanglement distribution, wherein the intermediate nodes distribute entangled particle pairs (e.g., pairs of optical photons) via optically protected network links to distribute entanglement between a set of endpoints for which entanglement distribution has been requested, according to some embodiments.

In some embodiments, quantum entanglement distribution with optical line protection as discussed in FIGS. 1-3, may be implemented in a larger quantum entanglement distribution network, such as shown in FIGS. 7-8.

FIG. 7 illustrates resources of a service provider network that provide quantum entanglement distribution to customer endpoints connected to intermediate nodes in a trust-free region outside of the trusted locations of the service provider network, wherein optical line protection is used to distribute the quantum entanglement, according to some embodiments.

In some embodiments, distribution of quantum entanglement may include distribution using multiple intermediate nodes and may be used to distribute quantum entanglement to various types of endpoints. In some embodiments, locations outside of the trust guarantees of service provider network 760 may include intermediate nodes 720 located in trust free region 718.

Note that in some embodiments, service provider network 760 shown in FIG. 7 may include similar components as service provider network 102 illustrated in FIGS. 1-3. Also, in some embodiments service provider network 760 may further include intermediate nodes 708. For example, each of the links between the intermediate nodes shown in FIG. 7 may be an optically protected quantum entanglement distribution system, such as shown in FIG. 1.

Also, each of the intermediate nodes illustrated in FIG. 7 may be a source site 104, receiver site 106, or both. Thus, each of the intermediate nodes illustrated in FIG. 7 may include the components shown included in source site 104 and/or the components illustrated in receiver site 104. For example, an intermediate node may be a receiver site with respect to an up-stream intermediate node and may also be a source site with respect to a down-stream intermediate node.

Additionally, in some embodiments, intermediate nodes 716, which may be included in trusted locations 762 or trust free region 718, may connect service provider network 760 to quantum hardware providers 710, 712, and/or 714 that offer one or more types of quantum computing resources to customers of service provider network 760. For example, quantum hardware providers 710, 712, and 714 may be connected to service provider network 760 via intermediate nodes 716 and/or may be connected to other intermediate nodes in trust free region 718 via intermediate nodes 716. Additionally, various different customers of service provider network may be connected in a way that distributed quantum entanglement can be distributed to the various other customers. For example, other customer endpoints 722 and 724 are connected to intermediate nodes 720 in trust free region 718.

In some embodiments, a customer endpoint may include one or more types of endpoint devices. For example, in some embodiments a customer endpoint may include a fiber-accessible customer endpoint 726, which is connected to a fiber modem for entanglement measurement 728. Additionally, or alternatively a customer endpoint may include a customer quantum device 730, for example for performing quantum measurements, or may include a full-fledged customer quantum computer 732.

In some embodiments, customer quantum computing device 730 and/or customer quantum computer 732 may further include a conversion interface. For example, in some embodiments, the conversion interface may convert a transmission frequency of a received particle to a different frequency and/or convert a frequency of an outgoing particle to a different frequency. For example, in some embodiments, fiber optical links may transmit photons using different frequency wavelengths and such variations may be adjusted via a conversion interface of customer quantum computing device 730 and/or customer quantum computer 732. In some embodiments, each of the customer endpoints may include the components shown included in receiver site 106, source site 104, or both.

In some embodiments, the classical computing services of a service provider network 760 may be implemented using classical computing resources 702. Also, in some embodiments, the quantum computing services may be implemented using quantum computing resources 704 of service provider network 760 or may be implemented using quantum processing units (QPUs) of quantum hardware providers 710, 712, or 714 connected to service provider network 760 via intermediate nodes 708 and/or 716 (as shown in FIG. 7).

As an example, a customer associated with fiber-accessible customer endpoint 726 may request entanglement distribution between fiber-accessible customer endpoint 726 and service provider network 760 in order to provide quantum secure communication between fiber-accessible customer endpoint 726 and classical compute resources 702 providing classical computing services to the customer. In response, routing may cause intermediate node 734 (which may be an entangled particle source node) to distribute respective particles of entangled particle pairs to quantum endpoint 706 and intermediate node 736 (which may be a quantum repeater node). Also, routing may cause intermediate node 738 (which may be an entangled particle source node) to distribute respective particles of entangled particle pairs to fiber-accessible customer endpoint 726 and intermediate node 736 (e.g., a quantum repeater node). Additionally, routing may instruct intermediate node 736 to perform joint quantum measurements on the received entangled quantum particles to extend the quantum entanglement such that quantum entanglement is distributed between quantum endpoint 706 and fiber-accessible customer endpoint 726. Because quantum endpoint 706 is within trusted location 762 (e.g., located at a data center with classical compute resources 702), secure communications may be exchanged between fiber-accessible customer endpoint 726 and classical compute resources 702 without concern for third parties intercepting or altering the communications as they flow through trust free region 718. Note that, in a similar manner, secure communications may be extended to quantum computing resources 704 and/or QPUs of quantum hardware providers 710, 712, or 714.

Note that as shown in FIG. 7 a given intermediate node such as intermediate node 720, 734, 708, 716, etc. may be connected to more than two network links. Thus, routing may select respective links to be used for a given intermediate node to form part of a network path from a larger group of network links connected to the respective intermediate node. In this way various different network paths for distributing quantum entanglement may be performed by selecting different combinations of network links from a larger set of network links connected to the respective ones of the intermediate nodes.

In some embodiments any one of the intermediate nodes may introduce a unitary transformation that requires distribution of state information in order for recipients to determine whether measurement results correlate or anti-correlate. Also, in some embodiments, more than one intermediate node may introduce a unitary transformation, in which case state information for each unitary transformation introduced would be needed to determine whether measurement results correlate or anti-correlate.

In some embodiments, the introduction of multiple transformations may be used by multiple independent parties to control quantum entanglement distribution delivery. For example, an operator of a quantum entanglement distribution service may release state information to recipients who have paid to receive the distributed entanglement. However, the quantum entanglement distribution service (or another actor) may condition release of additional state information needed to interpret measurement results on one or more conditions being met, such as a delivery delay period expiring. Thus, for a set of recipients to interpret quantum measurements, the recipients may need both the state information provided by the service provider in response to payment and the additional state information distributed in response to expiration of the delay period.

FIG. 8 illustrates intermediate nodes (that act as source and/or receiver sites) used in entanglement distribution, wherein the intermediate nodes distribute entangled particle pairs (e.g., pairs of optical photons) via optically protected network links to distribute entanglement between a set of endpoints for which entanglement distribution has been requested, according to some embodiments.

In some embodiments, a quantum repeater node, such as quantum repeater nodes 802 and 810, may include a quantum memory 808 configured to store received quantum particles of a set of entangled quantum particles. Additionally, repeater nodes 802 and 810 include entanglement measurement device 806 configured to perform joint quantum measurements on quantum particles stored in quantum memory 808, in order to determine a correlation relationship between stored quantum particles of respective pairs of entangled quantum particles (e.g., do the stored particles of the respective pairs of entangled particles have a same or opposite relationship). Additionally, quantum repeaters nodes 802 and 810 include a measurement communication interface 804 configured to provide the results of the joint measurements performed by entanglement measurement device 806 to respective endpoints, such as customer endpoint 812 and customer or third-party endpoint 820 to which the quantum entanglement is being distributed.

For example, in order to distribute quantum entanglement between customer endpoint 812 and customer (or third-party) endpoint 820, a routing selection module of a quantum entanglement distribution service may cause entangled particle source node 814 to distribute respective particles of an entangled particle pair to customer endpoint 812 and to quantum repeater 802 via optically protected fiber links connecting the entangled particle source node 814 to the customer endpoint 812 and connecting the entangled particle source node 814 the quantum repeater node 802. Additionally, the routing selection module of the quantum entanglement distribution service may cause entangled particle source node 818 to distribute respective particles of an entangled particle pair to customer endpoint 820 and to quantum repeater 802 via optically protected fiber links connecting the entangled particle source node 818 to the customer endpoint 820 and connecting the entangled particle source node 818 to the quantum repeater node 802. The quantum repeater node 802 may store the respective quantum particles received from entangled particle source nodes 814 and 818 in respective superposition states in quantum memory 808. Additionally, quantum repeater node 802 may perform joint measurements on the stored particles using entanglement measurement device 806 and may provide the results of the joint measurement to the respective endpoints 812 and 820 via measurement communication interface 804. For example, an entanglement measurement result 824 may be provided to customer endpoint 812 and an entanglement measurement result 822 may be provided to customer (or third-party) endpoint 820. The entanglement measurement results 822 and 824 may be transmitted via service channels, such as service channels 202 and 204. In some embodiments, the communication of the joint measurements may be performed using a public communication channel without compromising the security or privacy of the distributed quantum entanglement. For example, if a third-party were to intercept the joint measurements, such information could not be used to read or alter information communicated via the distributed quantum entanglement by others not sharing the distributed quantum entanglement. In some embodiments, additional basis measurements may be included with measurements 822 and 824, wherein the basis indicates which basis (e.g., horizontal/vertical, or diagonal) is to be used at either endpoint e.g., customer endpoint 812 and customer or third-party endpoint 820, wherein both the entanglement measurements (e.g., joint measurements) and the measurement basis (along with the state information distributed) enable quantum data to be communicated between the endpoints, such as communication of symmetric encryption keys, or communication of quantum information via quantum teleportation.

Figure 9:
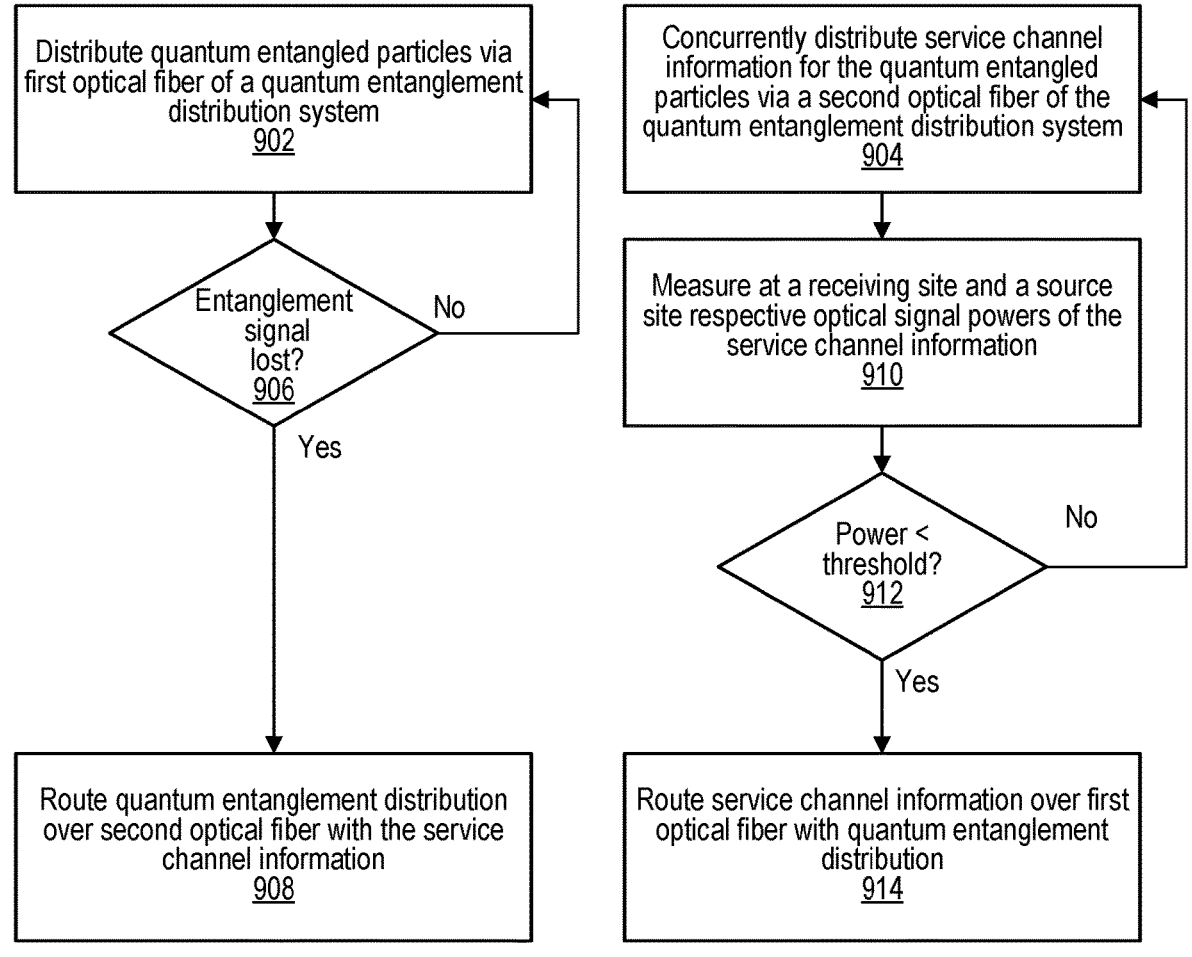
FIG. 9 is a flowchart illustrating a process of distributing quantum entanglement using optical line protection, according to some embodiments.

FIG. 9 is a flowchart illustrating a process of distributing quantum entanglement using optical line protection, according to some embodiments.

At block 902, quantum entangled particles are distributed over a first optical fiber of a set of multiple (e.g., two or more) optical fibers connecting a source site and a receiver site. Concurrently, at block 904, service channel information is exchanged between the source site and the receiver site using a second one of the set of optical fibers connecting the source site and the receiver site. This second optical fiber acts as a continuously monitored spare for the first optical fiber and is continuously monitored via the exchanged of service channel information, such as using power detectors as shown in FIG. 1.

At block 906, a receiver site determines whether there has been a loss of the signal distributed the quantum entangled particles. For example, entanglement storage/measurement device 128 may fail to receive any additional quantum entangled particles. In such a cause, the entanglement storage/measurement device 128 provides an indication to entanglement distribution controller 130, who in turn provides a failure indication via service channel information 204 to entanglement distribution controller 116, which then causes switch 118 to re-route the quantum entanglement distribution over the second optical fiber, such as optical pathway 142.

At block 910, the power detectors of the source site and the receiver site continuously monitor the "spare" optical fiber being used to communicate service channel information only, such as optical pathway 142 in the "normal" state. At block 912, a determination is made as to whether the measured power is less than a threshold level. If so, at block 914, the entanglement distribution controller 116 and 130 re-route the service channel information 202 and 204 to be communicated on a same fiber optical pathway, such as fiber optical pathway 140, as the quantum entanglement.

FIG. 10 is a flowchart illustrating restoration of a reserve optical path and re-configuration of a quantum entanglement distribution system using optical line protection in response to the restoration of the reserve optical path, according to some embodiments.

At block 1002, an indication or other manner of detection may be provided to the source site entanglement distribution controller 116 that the first optical pathway has been restored. If so, then at block 1004, the entanglement distribution controller 116 causes switch 118 to re-route the quantum entanglement back to the first optical pathway or causes switch 120 to route the service channel information to the recently restored optical pathway, thus leaving only the quantum entanglement distribution on the current optical pathway being used to distribute it.

At block 1006, entanglement distribution controllers 116 and 130 detect restoration of an optical pathway, such as the second optical pathway, and in response re-route the service channel information back to the second optical pathway.

Illustrative Computer System

Figure 11:
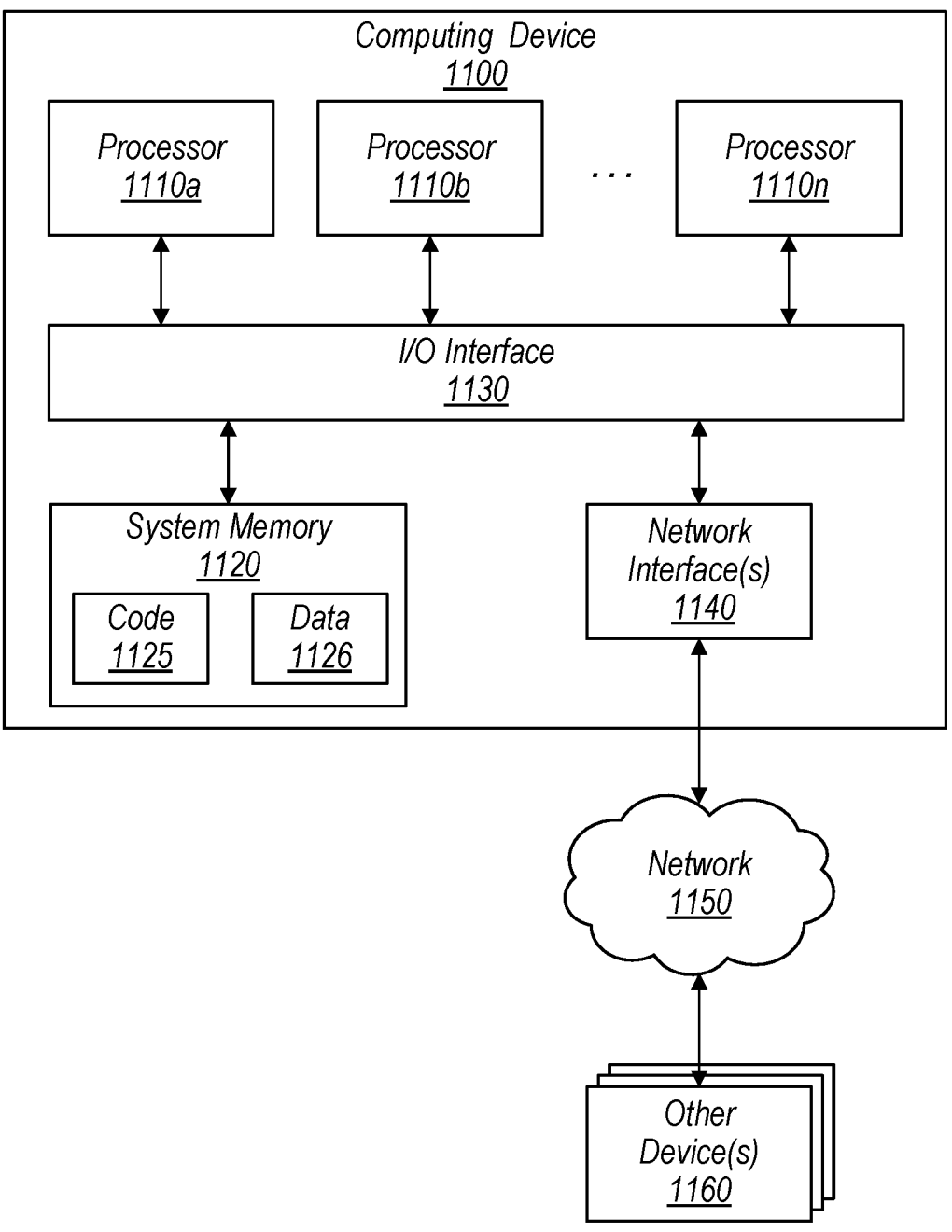
FIG. 11 is a block diagram illustrating an example computing device that may be used in at least some embodiments.

FIG. 11 illustrates such a general-purpose computing device 1100 as may be used in any of the embodiments described herein. In the illustrated embodiment, computing device 1100 includes one or more processors 1110 coupled to a system memory 1120 (which may comprise both non-volatile and volatile memory modules) via an input/output (I/O) interface 1130. Computing device 1100 further includes a network interface 1140 coupled to I/O interface 1130.

In various embodiments, computing device 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. In some implementations, graphics processing units (GPUs) may be used instead of, or in addition to, conventional processors.

System memory 1120 may be configured to store instructions and data accessible by processor(s) 1110. In at least some embodiments, the system memory 1120 may comprise both volatile and non-volatile portions; in other embodiments, only volatile memory may be used. In various embodiments, the volatile portion of system memory 1120 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1120 as code 1125 and data 1126.

In some embodiments, I/O interface 1130 may be configured to coordinate I/O traffic between processor 1110, system memory 1120, and any peripheral devices in the device, including network interface 1140 or other peripheral interfaces such as various types of persistent and/or volatile storage devices. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing device 1100 and other devices 1160 attached to a network or networks 1150, such as other computer systems or devices as illustrated in FIG. 1 through FIG. 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1100 via I/O interface 1130. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1100 as system memory 1120 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1140. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A service provider network system, comprising:
a source site for providing quantum entangled particles;
a receiver site for receiving quantum entangled particles transmitted from the source site;
a plurality of optical paths connecting the source site and the receiver site,
wherein the source site and the receiver site comprise:
one or more switches coupled to the plurality of optical paths; and
one or more power detectors configured to detect signal power for light transmitted using respective ones of the plurality of optical paths; and
one or more computing devices configured to implement a quantum entanglement distribution controller, the quantum entanglement distribution controller configured to:
cause quantum entangled particles to be transmitted from the source site to the receiver site via a first one of the plurality of optical paths;
concurrently cause service channel information to be transmitted from the source site to the receiver site via a second one of the plurality of optical paths, wherein the second optical path is configured to perform transmission of the quantum entangled particles;
receive signal power measurements from the one or more power detectors, wherein the signal power measurements indicate a signal power for the service channel information being concurrently transmitted via the second optical path while the entangled particles are being transmitted via the first optical path; and
in response to the signal power measurements for the service channel information falling below a threshold level:
cause the one or more switches to route the service channel information from the source site to the receiver site via the first optical path; and
provide an indication that the second optical path is currently unavailable as a spare optical path for transmission of the quantum entangled particles from the source site to the receiver site.

2. The system of claim 1, wherein the quantum entangled particles and the service channel information are transmitted using different frequencies of light.

3. The system of claim 1, wherein the entangled quantum particles comprise secure shared randomness used for quantum encrypted keys, and wherein the system implements quantum encrypted key distribution between the source site and the receiver site.

4. The system of claim 1, wherein the quantum entanglement distribution controller is further configured to:
receive information indicating a failure, at the receiver site, to receive the quantum entangled particles;
cause, at the source site, a given one of the one or more switches to switch such that a quantum entanglement source at the source site is aligned to transmit the quantum entangled particles using the second optical path.

5. A quantum entanglement distribution system, comprising:
one or more switches coupled to a plurality of optical paths; and
one or more power detectors configured to detect signal power for light transmitted using one or more of the plurality of optical paths; and
one or more computing devices configured to:
cause quantum entangled particles to be transmitted from a source site to a receiver site via a first one of the plurality of optical paths;
concurrently cause service channel information to be transmitted from the source site to the receiver site via a second one of the plurality of optical paths; and
in response to a signal power measurement for the service channel information falling below a threshold level:
cause the one or more switches to route the service channel information from the source site to the receiver site via the first optical path; and
provide an indication that the second optical path is currently unavailable as a spare optical path for transmission of the quantum entangled particles from the source site to the receiver site.

6. The quantum entanglement distribution system of claim 5, wherein the quantum entangled particles and the service channel information are transmitted using different frequencies of light.

7. The quantum entanglement distribution system of claim 6, wherein:
a first portion of the service channel information is transmitted from the source site to the receiver site using a first wavelength of light,
a second portion of the service channel information is transmitted from the receiver site to the source site using a second wavelength of light, and
the quantum entangled particles are transmitted from the source site to the receiver site using a third wavelength of light.

8. The quantum entanglement distribution system of claim 5, wherein the entangled quantum particles comprise secure shared randomness used for quantum encrypted key distribution.

9. The quantum entanglement distribution system of claim 5, wherein the source site and the receiver site comprise respective data centers of a service provider network.

10. The quantum entanglement distribution system of claim 5, wherein the source site comprises a data center of a service provider network, and the receiver site comprises computing resources of a customer of the service provider network.

11. The quantum entanglement distribution system of claim 5, wherein the one or more computing devices are further configured to:
receive information indicating a failure, at the receiver site, to receive the quantum entangled particles;
cause, at the source site, a given one of the one or more switches to switch such that a quantum entanglement source at the source site is aligned to transmit the quantum entangled particles using the second optical path.

12. The quantum entanglement distribution system of claim 5, wherein providing the indication that the second optical path is currently unavailable as a spare optical path for transmission of the quantum entangled particles from the source site to the receiver site comprises:
sending, prior to switching the routing of the service channel information to be over the first optical path, a message in the service channel information transmitted over the second optical path, wherein the message indicates to switch the service channel information routing to the first optical path.

13. The quantum entanglement distribution system of claim 5, wherein providing the indication that the second optical path is currently unavailable as a spare optical path for transmission of the quantum entangled particles from the source site to the receiver site comprises:
interrupting for a set amount of time, prior to switching the routing of the service channel information to be over the first optical path, transmission of the service channel information transmitted over the second optical path, wherein the interruption for the set amount of time indicates to switch the service channel information routing to the first optical path.

14. The quantum entanglement distribution system of claim 5, wherein the one or more computing devices are further configured to:
detect a restoration of the signal power measurement for the second optical path to a level above the threshold level; and
in response to said detecting, cause the one or more switches to route the service channel information from the source site to the receiver site via the second optical path.

15. The quantum entanglement distribution system of claim 5, further comprising:
the plurality of optical paths connecting the source site and the receiver site, wherein the plurality of optical paths are independent paths that do not have a shared geography.

16. The quantum entanglement distribution system of claim 15, wherein the service channel information further comprises:
measurement basis information for measurements of the quantum entangled particles performed at the source site or the receiver site.

17. A method of distributing quantum entanglement, comprising:
causing quantum entangled particles to be transmitted from a source site to a receiver site via a first optical paths
concurrently causing service channel information to be transmitted from the source site to the receiver site via a second optical path; and
in response to a signal power measurement for the service channel information falling below a threshold level:
causing one or more switches to route the service channel information from the source site to the receiver site via the first optical path; and
providing an indication that the second optical path is currently unavailable as a spare optical path for transmission of the quantum entangled particles from the source site to the receiver site.

18. The method of claim 17, further comprising:
detecting a restoration of the signal power measurement for the second optical path to a level above the threshold level; and
in response to said detecting, causing the one or more switches to route the service channel information from the source site to the receiver site via the second optical path.

19. The method of claim 17, wherein the entangled quantum particles comprise secure shared randomness used for quantum encrypted key distribution.

20. The method of claim 17, wherein the quantum entangled particles and the service channel information are transmitted using different wavelengths.

* * * * *